(12) United States Patent
Takaichi et al.

(10) Patent No.: US 9,986,001 B2
(45) Date of Patent: May 29, 2018

(54) INFORMATION PROCESSING APPARATUS

(71) Applicant: Sony Computer Entertainment Inc., Tokyo (JP)

(72) Inventors: Tomoki Takaichi, Tokyo (JP); Norihiko Shiomi, Tokyo (JP); Masahiro Fujihara, Tokyo (JP); Tomohiro Ogawa, Kanagawa (JP); Erika Ohno, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 120 days.

(21) Appl. No.: 14/438,392

(22) PCT Filed: Jun. 3, 2013

(86) PCT No.: PCT/JP2013/003492
§ 371 (c)(1),
(2) Date: Apr. 24, 2015

(87) PCT Pub. No.: WO2014/068806
PCT Pub. Date: May 8, 2014

(65) Prior Publication Data
US 2015/0281296 A1 Oct. 1, 2015

(30) Foreign Application Priority Data

Nov. 5, 2012 (JP) ................................. 2012-243802

(51) Int. Cl.
*G06F 15/16* (2006.01)
*H04L 29/06* (2006.01)
(Continued)

(52) U.S. Cl.
CPC ........ *H04L 65/4069* (2013.01); *A63F 13/355* (2014.09); *A63F 13/86* (2014.09);
(Continued)

(58) Field of Classification Search
CPC ...... H04L 65/4069; A63F 13/86; A63F 13/87; H04N 21/4781; H04N 21/4788
(Continued)

(56) References Cited

U.S. PATENT DOCUMENTS 5,558,339 A * 9/1996 Perlman .................. A63F 13/12
463/23
8,066,572 B1 * 11/2011 Timmons ................ H04L 67/38
273/239

(Continued)

FOREIGN PATENT DOCUMENTS

CN 101127875 A1 2/2010
CN 101889274 A 11/2010
(Continued)

OTHER PUBLICATIONS

European Search Report for corresponding EP Application EP 13850578.9, 9 pages, dated Dec. 21, 2016.
(Continued)

*Primary Examiner* — Anthony Mejia
(74) *Attorney, Agent, or Firm* — Matthew B. Dernier, Esq.

(57) ABSTRACT

A streaming data acquisition section acquires streaming data distributed from a server and including an application image, and a streaming data reproduction section reproduces the streaming data. A command input acceptance section accepts a command input to an application inputted by a user. A command transmission section transmits the inputted command. The command is provided to an information processing apparatus of a distributor of the streaming data and is reflected on processing of the application being executed in the information processing apparatus.

14 Claims, 22 Drawing Sheets

(51) Int. Cl.
*A63F 13/355* (2014.01)
*H04N 21/478* (2011.01)
*H04N 21/4788* (2011.01)
*A63F 13/86* (2014.01)
*A63F 13/87* (2014.01)

(52) U.S. Cl.
CPC ......... *A63F 13/87* (2014.09); *H04N 21/4781* (2013.01); *H04N 21/4788* (2013.01)

(58) Field of Classification Search
USPC ........................................................ 709/231
See application file for complete search history.

(56) References Cited

U.S. PATENT DOCUMENTS

| | | | |
|---|---|---|---|
| 8,366,552 B2* | 2/2013 | Perlman | A63F 13/12 463/42 |
| 9,186,580 B2 | 11/2015 | Tanaka | |
| 9,770,662 B2 | 9/2017 | Uchibori | |
| 2002/0038345 A1 | 3/2002 | Takatsuka | |
| 2006/0058103 A1* | 3/2006 | Danieli | A63F 13/12 463/42 |
| 2007/0117617 A1* | 5/2007 | Spanton | A63F 13/12 463/29 |
| 2007/0117635 A1* | 5/2007 | Spanton | A63F 13/12 463/43 |
| 2008/0119286 A1* | 5/2008 | Brunstetter | A63F 13/00 463/43 |
| 2009/0118017 A1 | 5/2009 | Perlman | |
| 2009/0124387 A1 | 5/2009 | Perlman | |
| 2009/0253506 A1 | 10/2009 | Ishii | |
| 2009/0289945 A1 | 11/2009 | Peterfreund | |
| 2010/0035691 A1* | 2/2010 | Wild | H04L 67/24 463/42 |
| 2010/0281156 A1* | 11/2010 | Kies | G06F 11/3414 709/224 |
| 2010/0317429 A1* | 12/2010 | Van Luchene | G06Q 20/108 463/29 |
| 2011/0032250 A1 | 2/2011 | Tanaka | |
| 2011/0306395 A1* | 12/2011 | Ivory | A63F 13/49 463/1 |
| 2011/0312424 A1* | 12/2011 | Burckart | H04N 21/4781 463/42 |
| 2012/0021827 A1* | 1/2012 | Raitt | A63F 13/63 463/31 |
| 2012/0028706 A1* | 2/2012 | Raitt | A63F 13/10 463/31 |
| 2012/0064969 A1 | 3/2012 | Uchibori | |
| 2012/0149476 A1 | 6/2012 | Perlman | |
| 2012/0233564 A1 | 9/2012 | Tsuchiya | |
| 2013/0079128 A1* | 3/2013 | Thomas | A63F 13/12 463/30 |

FOREIGN PATENT DOCUMENTS

| | | |
|---|---|---|
| EP | 1391226 A1 | 2/2004 |
| JP | 2002268651 A | 9/2002 |
| JP | 2002297498 A | 10/2002 |
| JP | 2008245987 A | 10/2008 |
| JP | 2009183315 A | 8/2009 |
| JP | 2009230585 | 10/2009 |
| JP | 2009247562 A | 10/2009 |
| JP | 2011507077 A | 3/2011 |
| JP | 2011072735 A | 4/2011 |
| JP | 2011217143 A | 10/2011 |
| JP | 2012034792 A | 2/2012 |
| JP | 2012061060 A | 3/2012 |
| JP | 2012187209 A | 10/2012 |
| WO | 2009073800 A1 | 6/2009 |
| WO | 2013099392 A1 | 7/2013 |

OTHER PUBLICATIONS

International Preliminary Report on Patentability and Written Opinion for corresponding PCT Application PCT/JP2013/003492, 8 pages, dated May 14, 2015.
Office Action for corresponding Japanese Patent Application No. 2014544210, pp. 1-8, dated Feb. 23, 2016.
International Search Report for corresponding application No. PCT/JP2013/003492, dated Sep. 3, 2013.
Office Action for corresponding CN Application CN 12013800563768, 20 pages, dated May 27, 2017.
Office Action for corresponding JP Application 2014-544210, 10 pages, dated Nov. 28, 2017.
Office Action for corresponding JP Application 2017-005339, 9 pages, dated Jan. 9, 2018.

* cited by examiner

F I G . 2
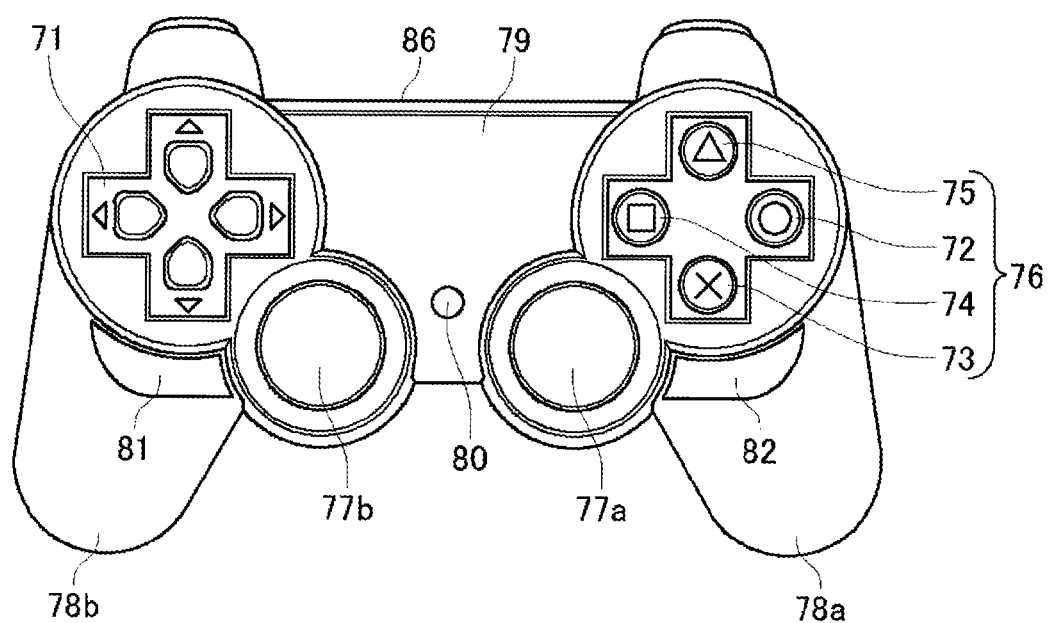

PLEASE WAIT A LITTE

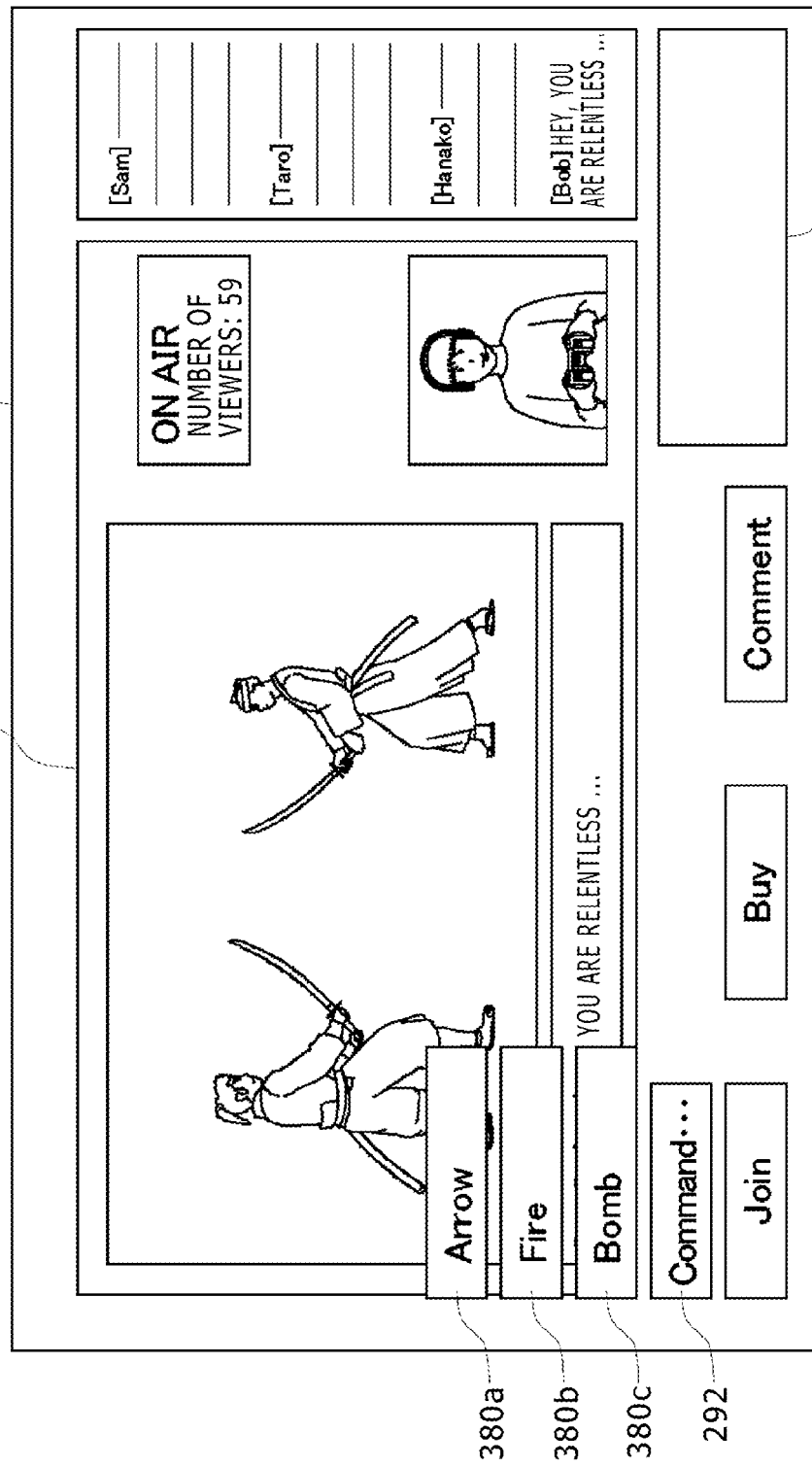

INFORMATION PROCESSING APPARATUS

TECHNICAL FIELD

The present invention relates to a technology for distributing or viewing streaming data of an application of a game or the like.

BACKGROUND ART

As a communication tool for many people, various social networking services (SNS) are being utilized. Also a service for sharing a moving picture prepared or captured by a user has become widespread, and a user can share various pieces of information with different users on a network.

SUMMARY

Technical Problem

In recent years, environments in which a plurality of users can play a game together through the Internet have been prepared. Such a network service of a game as just described already has a role as a communication tool, and construction of a mechanism by which information can be shared efficiently between friends or with strangers is demanded. Especially, it is expected to make it possible to streaming distribute a game image being played by a user simply and readily such that, through sharing of a live video of the game with a different user, the fun of the game can be spread and communication between users becomes active. It is to be noted that it is preferable for information to be shared efficiently not only in a game but also in a different type of a network service in which a plurality of information processing apparatuses are connected to each other.

Therefore, it is an object of the present invention to provide a technology for streaming distributing or viewing image data of an application.

Solution to Problem

In order to solve the problem described above, according to a mode of the present invention, there is provided an information processing apparatus including a first acquisition unit configured to acquire streaming data including an application image, an image generation unit configured to reproduce the streaming data, an acceptance unit configured to accept a command input to an application, and a transmission unit configured to transmit the inputted command.

Also another aspect of the present invention is directed to an information processing apparatus. The apparatus includes an execution unit configured to execute an application, an image generation unit configured to generate image data to be displayed on an outputting apparatus, a sharing processing unit configured to transmit the image data generated by the image generation unit, and an acquisition unit configured to acquire information relating to the image data. The image generation unit generates image data including an application image and an image of the information acquired by the acquisition unit, and the sharing processing unit encodes and transmits the image data to be displayed on the outputting apparatus.

It is to be noted that also arbitrary combinations of the constituent elements described above and the representations of the present invention obtained by conversion thereof between a method, an apparatus, a system, a recording medium, a computer program and so forth are effective as modes of the present invention.

BRIEF DESCRIPTION OF DRAWINGS

FIG. 2 is a diagram depicting an appearance configuration of an inputting apparatus.

FIG. 14 is a diagram depicting another example of a message image.

FIG. 22 is a diagram depicting an example of a command image.

DESCRIPTION OF EMBODIMENT

Figure 1:
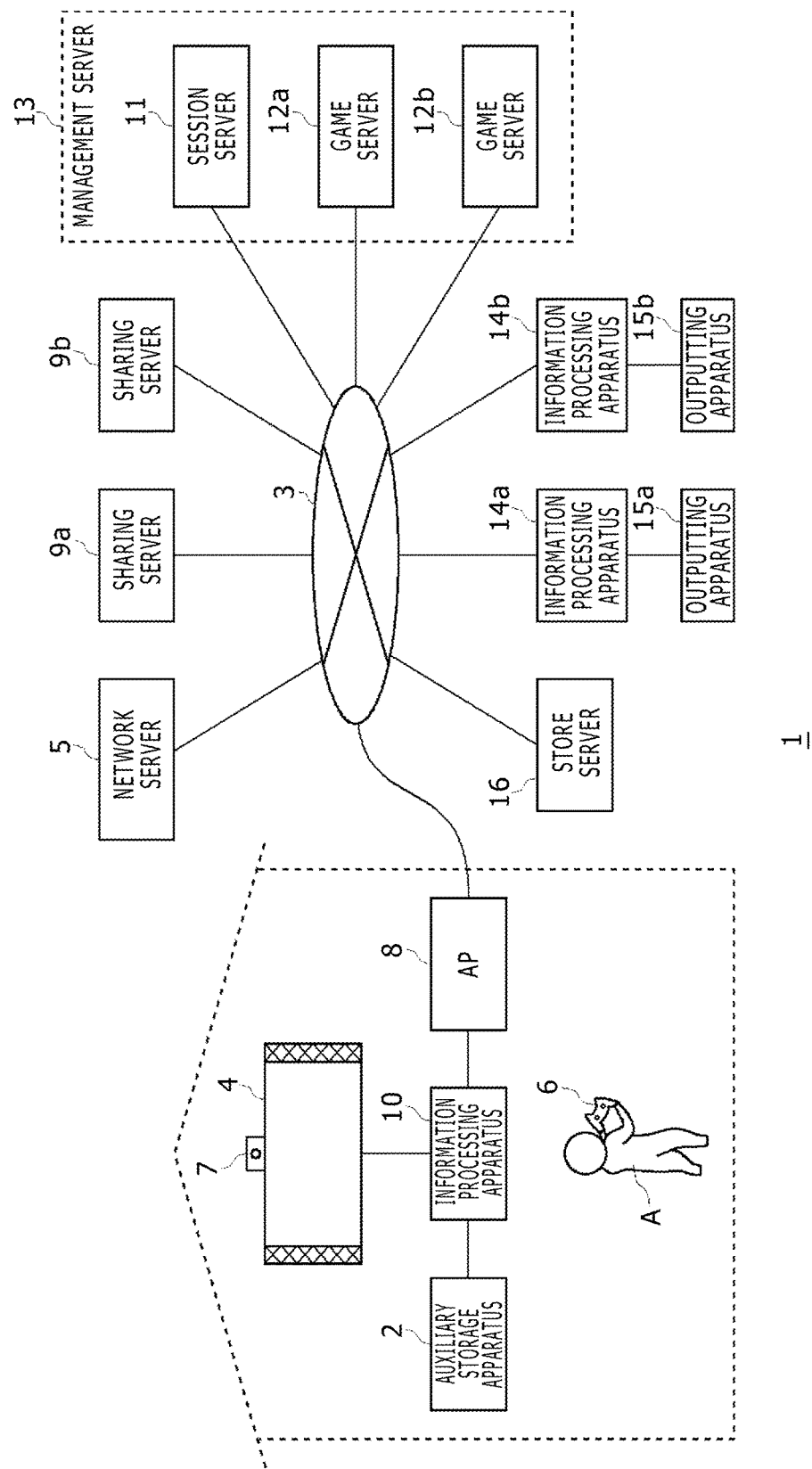
FIG. 1 is a diagram depicting an information processing system according to an embodiment of the present invention.

FIG. 1 depicts an information processing system 1 according to an embodiment of the present invention. The information processing system 1 includes an information processing apparatus 10 of a distribution user of streaming data, a network server 5, sharing servers 9a and 9b, a management server 13, a store server 16, and information processing apparatuses 14a and 14b of viewing users of streaming data. The components mentioned are connected to each other through a network 3 such as the Internet or a LAN (Local Area Network). The management server 13 manages session information of a game and the address (for example, IP address) of the information processing apparatus 10 of the distribution user and is illustrated here as a concept which supervises a session server 11 and game servers 12a and 12b. The session server 11 is maintained and managed by a management entity of the information processing system 1, and the game servers 12a and 12b are maintained and managed each by a maker, a publisher or the like of a game.

An access point (hereinafter referred to as "AP") 8 has functions of a wireless access point and a router, and the information processing apparatus 10 can connect to the AP 8 by wireless or wire connection so as to connect for communication to the network server 5, sharing servers 9a and 9b, session server 11, game servers 12a and 12b and store server 16 on the network 3. Also the information processing apparatuses 14a and 14b are similarly connected for communication with the network server 5, sharing servers 9a and 9b, session server 11, game servers 12a and 12b and store server 16. It is to be noted that the information processing apparatus 10 and the information processing apparatuses 14 can be connected for communication directly without the intervention of a server such as the game servers 12.

The information processing apparatus 10 establishes connection to an inputting apparatus 6, which is operated by a user, by wireless or wire connection, and the inputting apparatus 6 outputs operation information representative of a result of the operation of the user to the information processing apparatus 10. If the information processing apparatus 10 accepts operation information from the inputting apparatus 6, then it reflects the operation information on processing of system software or application software, and a result of the processing is outputted from an outputting apparatus 4. In the information processing system 1, the information processing apparatus 10 may be a game apparatus which executes a game, and the inputting apparatus 6 may be an apparatus which supplies operation information of the user to the information processing apparatus 10 such as a game controller. In order to play a game, the user would log in to OS (System Software) of the information processing apparatus 10. Users who log in to the system software are managed by user accounts registered in the information processing apparatus 10.

The network server 5 is maintained and managed by the management entity of the information processing system 1 and provides a network service of a game to users of the information processing system 1. The network server 5 manages network accounts for identifying the users, and a user would use its network account to sign in to the network service provided by the network server 5. By signing in to the network service from the information processing apparatus 10, the user can register save data of a game or a virtual award article (trophy) acquired during game play into the network server 5.

The sharing servers 9a and 9b provide a service for sharing image data uploaded or distributed from the information processing apparatus 10 and/or information relating to such image data. For example, the sharing server 9a may be a server which provides an SNS, and the sharing server 9b may be a server which provides an image sharing (distribution) service. In the following description, where the sharing servers 9a and 9b are not distinguished from each other, each of them is referred to as "sharing server 9." In the information processing system 1, the number of sharing servers 9 is not limited to two as depicted in FIG. 1 but may be a greater number. In the information sharing service provided by the sharing servers 9, the users of interest may be limited to registered members or may be open to the general. In the present embodiment, "to share data or information" signifies to establish a state in which a user other than users who upload or distribute data or information to the sharing server 9 can access (for example, view) the data or information, but does not make a question of whether or not a user who can access is limited to particular members.

It is to be noted that, in the present embodiment, the sharing server 9 is configured as a streaming server which receives streaming data transmitted thereto from the information processing apparatus 10, transcodes the streaming data and distributes the transcoded data as a live content. The information processing apparatus 10 encodes image data same as image data which forms a display image of the outputting apparatus 4 into data of a streaming format and transmits the encoded data to the sharing server 9. The information processing apparatuses 14a and 14b are connected to the sharing server 9 to receive the streaming data and decodes and output the received data from outputting apparatuses 15a and 15b, respectively. Here, the streaming data is image data of a game played by a user A on the information processing apparatus 10, and the users of the information processing apparatuses 14a and 14b can view a play video of the user A in a live state. In the following description, where the information processing apparatuses 14a and 14b are not distinguished from each other, each of them is referred to as "information processing apparatus 14."

The information processing apparatus 14 is a terminal apparatus having a function of reproducing streaming data distributed from the sharing server 9. Although the information processing apparatus 14 may be a personal computer of the installation type or a mobile apparatus having a Web browser function, it may be an apparatus same as the information processing apparatus 10 of the distribution user, namely, a same game apparatus. Where the information processing apparatus 14 of the viewing user is the information processing apparatus 10 which incorporates a viewing application hereinafter described, the viewing user can enjoy a sharing service which is high in convenience.

The management server 13 manages connection between the information processing apparatus 14 and the information processing apparatus 10 when the user of the information processing apparatus 14 plays a game together with the user A of the information processing apparatus 10. The game servers 12a and 12b correspond to games different from each other and individually generate sessions of the corresponding games independently of each other. The form of a game session relies upon the game, and conventionally it is necessary for a user who participates in a game session to directly access the game server 12 corresponding to the game to apply for participation. In the information processing system 1 of the present embodiment, the session server 11 collects session information from the game servers 12a and 12b and comprehensively manages the session information. Therefore, a user who wants to participate can acquire the session information of the corresponding game server 12 by accessing the session server 11. Consequently, in comparison with an alternative case in which the game server 12 is accessed directly, a simple and easy acquisition process can be implemented.

In this manner, the information processing apparatus 14 acquires session information from the session server 11. If the information processing apparatus 14 is a game apparatus of a type same as that of the information processing apparatus 10, then the information processing apparatus 14 can acquire session information from the session server 11 and can participate in a game being executed by the information processing apparatus 10. The session server 11 may be maintained and managed by a management entity same as that of the network server 5.

It is to be noted that the session server 11 not only manages session information but also manages address information of the information processing apparatus 10 connected to the network 3. The address information of the information processing apparatus 10 may be, for example, an IP address. For example, the session server 11 may be provided with the address information of the information processing apparatus 10 from the network server 5. The store server 16 provides a site which sells an application of a game or the like.

The auxiliary storage apparatus 2 is a large capacity storage apparatus such as an HDD (Hard Disk Drive) or a flash memory and may be an external storage apparatus connected to the information processing apparatus 10 by a USB (Universal Serial Bus) or may be a built-in type storage apparatus. The outputting apparatus 4 may be a television set having a display unit which outputs an image and a speaker which outputs sound or may be a computer display unit. The outputting apparatus 4 may be connected to the information processing apparatus 10 by a wire cable or by wireless connection.

The inputting apparatus 6 is configured having a plurality of inputting units such as a plurality of operation buttons of the push type, an analog stick which can input an analog quantity and turning buttons. A camera 7 which is an image pickup apparatus is provided in the proximity of the outputting apparatus 4 and picks up an image of a space around the outputting apparatus 4. While FIG. 1 depicts an example wherein the camera 7 is attached to an upper portion of the outputting apparatus 4, the camera 7 may otherwise be disposed sidewardly of the outputting apparatus 4. Whatever the case may be, the camera 7 is disposed at a position at which the camera 7 can pick up an image of a user who plays a game in front of the outputting apparatus 4. The information processing apparatus 10 has a function of authenticating the face of the user from a picked up image of the camera 7.

FIG. 2 depicts an appearance configuration of the inputting apparatus 6. The user would grip a left side grip portion 78b by the left hand and grip a right side grip portion 78a by the right hand to operate the inputting apparatus 6. A direction key 71, analog sticks 77a and 77b and four kinds of operation buttons 76, which configure an inputting unit, are provided on a housing upper face 79 of the inputting apparatus 6. The four kinds of buttons 72 to 75 have different figures inscribed in different colors thereon in order to distinguish them from each other. In particular, a red round mark is inscribed on the ○ button 72; a blue cross mark is inscribed on the X button 73; a violet square mark is inscribed on the □ button 74; and a green triangle mark is inscribed on the Δ button 75. On the housing upper face 79, a touch pad may be provided in a flat region between the direction key 71 and the operation buttons 76.

A function button 80 is provided between the two analog sticks 77a and 77b. The function button 80 is used to turn on the power supply to the inputting apparatus 6 and simultaneously make active a communication function of connecting the inputting apparatus 6 and the information processing apparatus 10 to each other. It is to be noted that, when the main power supply to the information processing apparatus 10 is in an off state, if the function button 80 is depressed, the information processing apparatus 10 accepts a connection request transmitted from the inputting apparatus 6 also as an instruction to turn on the main power supply. Consequently, the main power supply to the information processing apparatus 10 is turned on. After the inputting apparatus 6 is connected to the information processing apparatus 10, the function button 80 is used also to cause the information processing apparatus 10 to display a menu screen image.

A SHARE button 81 is provided on the left side of the left side analog stick 77b. The SHARE button 81 is utilized to input an instruction from the user to the system software in the information processing apparatus 10. An OPTION button 82 is provided on the right side of the right side analog stick 77a. The OPTION button 82 is utilized to input an instruction from the user to application (game) software executed by the information processing apparatus 10. The SHARE button 81 and the OPTION button 82 may each be formed as a push-type button.

Figure 3:
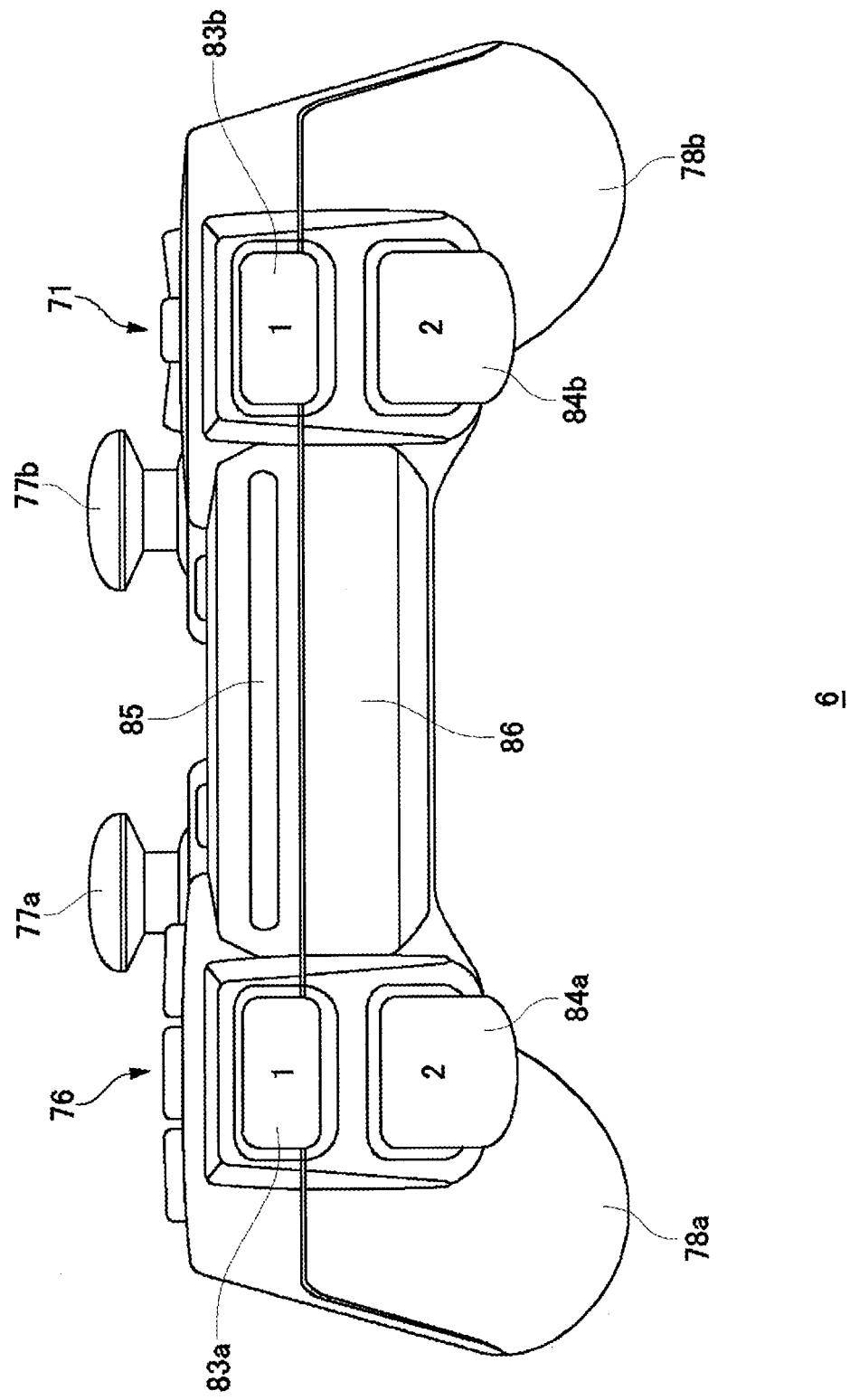
FIG. 3 is a diagram depicting an appearance configuration of the inputting apparatus on the rear face side.

FIG. 3 depicts an appearance configuration of the inputting apparatus 6 on the rear face side. A light emitting region 85 of a horizontally elongated substantially rectangular shape is provided on a housing rear face 86 of the inputting apparatus 6. The light emitting region 85 has LEDs of red (R), green (G) and blue (B), which are turned on in accordance with emission light color information transmitted from the information processing apparatus 10. On the housing rear face 86, an upper side button 83a, a lower side button 84a and another upper side button 83b, another lower side button 84b are provided at left-right symmetrical positions in a longitudinal direction. The upper side button 83a and the lower side button 84a are operated by the forefinger and the middle finger of the right hand of the user, respectively, and the upper side button 83b and the lower side button 84b are operated by the forefinger and the middle finger of the left hand of the user, respectively. Since the light emitting region 85 is provided between the row of the upper side button 83a and the lower side button 84a on the right side and the row of the upper side button 83b and the lower side button 84b on the left side as depicted in FIG. 3, the camera 7 can suitably pick up an image of the light emitting region 85 that has been turned on while the light emitting region 85 is not hidden by the forefinger or the middle finger by which a button is operated. The upper side buttons 83 may be configured as the push type buttons, and the lower side buttons 84 may be configured as the trigger type buttons which are rotatably supported.

Figure 4:
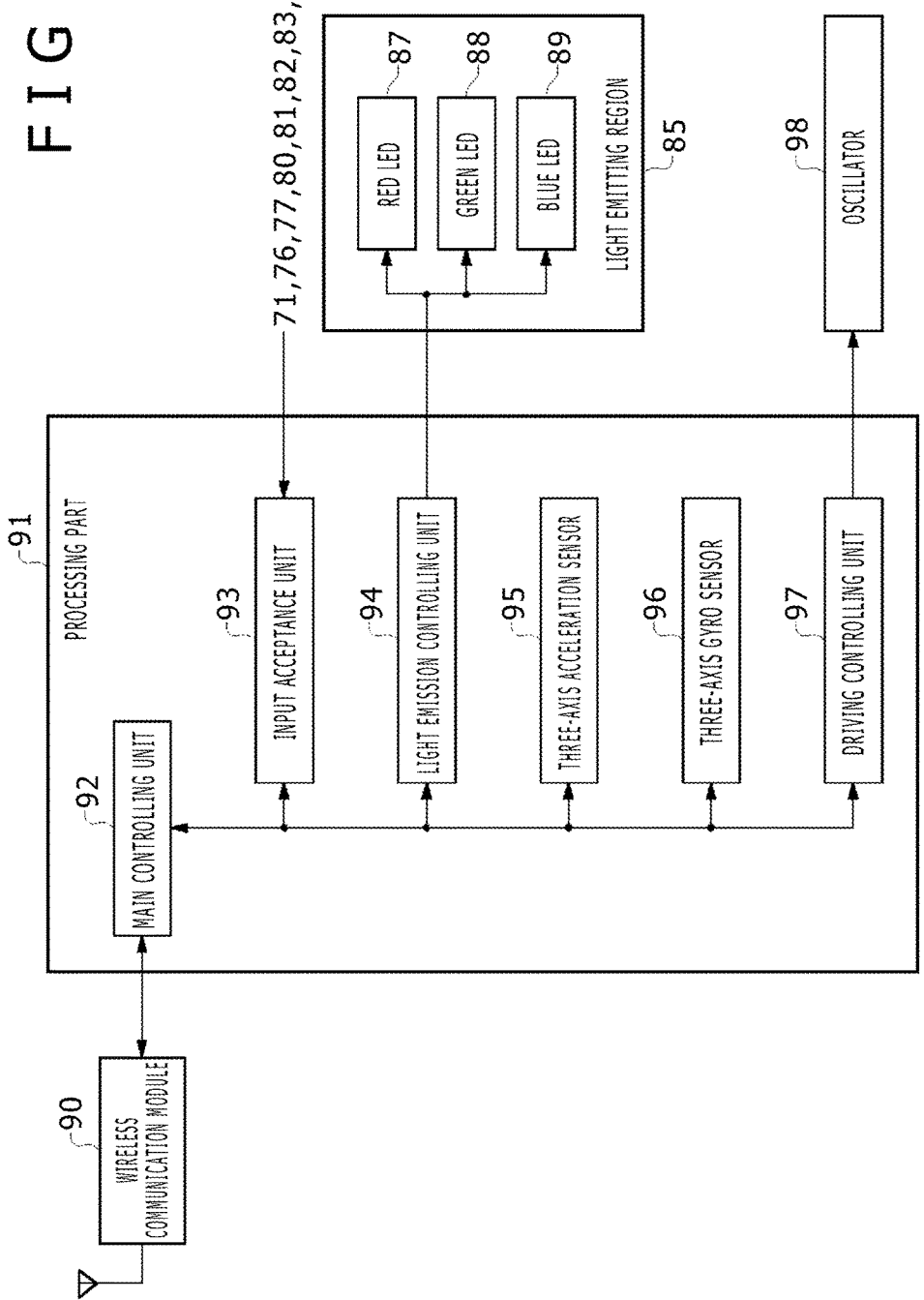
FIG. 4 is a diagram depicting an internal configuration of the inputting apparatus.

FIG. 4 depicts an internal configuration of the inputting apparatus 6. The inputting apparatus 6 includes a wireless communication module 90, a processing part 91, the light emitting region 85 and an oscillator 98. The wireless communication module 90 has a function of transferring data to and from a wireless communication module of the information processing apparatus 10. The processing part 91 executes expected processing of the inputting apparatus 6.

The processing part 91 has a main controlling unit 92, an input acceptance unit 93, a light emission controlling unit 94, a three-axis acceleration sensor 95, a three-axis gyro sensor 96 and a driving controlling unit 97. The main controlling unit 92 carries out transfer of necessary data to and from the wireless communication module 90.

The input acceptance unit 93 accepts operation information of an inputting unit such as the direction key 71, operation buttons 76, analog sticks 77, function button 80, SHARE button 81, OPTION button 82, upper side buttons 83 and lower side buttons 84 and transmits the operation information to the main controlling unit 92. The main controlling unit 92 supplies the received operation information to the wireless communication module 90, and the wireless communication module 90 transmits the operation information at a predetermined timing to the information processing apparatus 10. It is to be noted that the main controlling unit 92 may convert the received operation information into predetermined control information as occasion demands.

The light emission controlling unit 94 controls emission of light of a red LED 87, a green LED 88 and a blue LED 89 which configure the light emitting region 85. If the information processing apparatus 10 transmits emission light color information for designating an emission light color of the light emitting region 85, then the emission light color information from the information processing apparatus 10 is received by the wireless communication module 90 and is passed to the main controlling unit 92. The main controlling unit 92 notifies the light emission controlling unit 94 of the emission light color information. Consequently, the light emission controlling unit 94 can control the light emitting region 85 to emit light of the designated emission light color.

The oscillator 98 is configured including an eccentric motor and is provided in order to oscillate the entire inputting apparatus 6. When the wireless communication module 90 receives an oscillation controlling signal from the information processing apparatus 10, it supplies the oscillation controlling signal to the main controlling unit 92, and the main controlling unit 92 controls the driving controlling unit 97 to cause the oscillator 98 to oscillate in accordance with the oscillation controlling signal. The driving controlling unit 97 may be configured as a switch for driving the oscillator 98 or may be configured as a PWM controlling unit which varies the duty ratio of a supply voltage.

The three-axis acceleration sensor 95 detects acceleration components in three-axis directions of XYZ of the inputting apparatus 6. The three-axis gyro sensor 96 detects angular velocities on an XZ plane, a ZY plane and a YX plane. The main controlling unit 92 accepts detection value information from the three-axis acceleration sensor 95 and the three-axis gyro sensor 96, and the wireless communication module 90 transmits the detection value information to the information processing apparatus 10 in a predetermined cycle together with operation information of a button input or the like.

Figure 5:
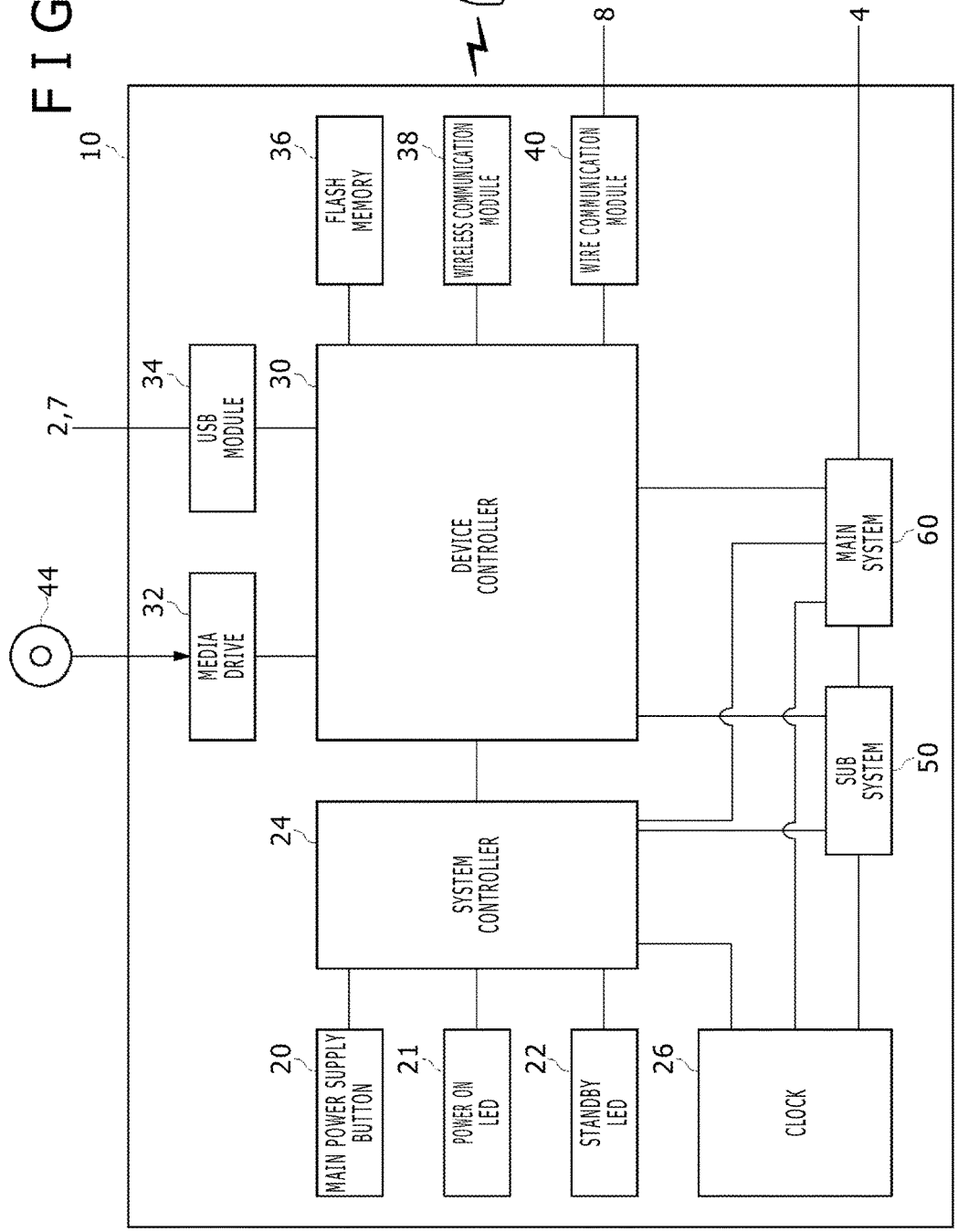
FIG. 5 is a diagram depicting a functional block diagram of an information processing apparatus.

FIG. 5 depicts a functional block diagram of the information processing apparatus 10. The information processing apparatus 10 is configured including a main power supply button 20, a power ON LED 21, a standby LED 22, a system controller 24, a clock 26, a device controller 30, a media drive 32, a USB module 34, a flash memory 36, a wireless communication module 38, a wire communication module 40, a sub system 50 and a main system 60.

The main system 60 is configured having a main CPU (Central Processing Unit), and the sub system 50 is configured having a sub CPU. The main CPU and the sub CPU operate exclusively. While the main CPU is started and is in an active state, the sub CPU is in a standby state, but while the sub CPU is started and is in an active state, the main CPU is in a standby state. While the main power supply to the information processing apparatus 10 remains on, the main CPU executes various processes of an application or the like under an environment generated by system software while the sub CPU is asleep. On the other hand, if the main power supply to the information processing apparatus is turned off, then the main CPU starts up the sub CPU and enters an asleep state. In this manner, the main CPU and the sub CPU operate exclusively.

The main power supply button 20 is an inputting unit to which an operation input from the user is carried out and is provided on a front face of a housing of the information processing apparatus 10 such that it is operated in order to turn on or off the power supply to the main system 60 of the information processing apparatus 10. In the following description, that the main power supply is in an on state signifies that the main system 60 is in an active state, and that the main power supply is in an off state signifies that the main system 60 is in a standby state. The power ON LED 21 is turned on when the main power supply button 20 is turned on, and the standby LED 22 is turned on when the main power supply button 20 is turned off. It is to be noted that such a configuration that turning on/off of the main power supply is carried out by a short press operation of the main power supply button 20 but, if the main power supply button 20 is long-pressed, then the system power supply to the information processing apparatus 10 is turned off to stop the power supply to the information processing apparatus 10 may be adopted.

The system controller 24 detects depression of the main power supply button 20 by the user. If the main power supply button 20 is depressed while the main power supply is in an off state, then the system controller 24 acquires the depression operation as an "on instruction," but if the main power supply button 20 is depressed while the main power supply is in an on state, then the system controller 24 acquires the depression operation as an "off instruction." It is to be noted that turning on/off of the main power supply can be controlled from the inputting apparatus 6 as described hereinabove, and if the function button 80 of the inputting apparatus 6 is depressed when the main power supply is in an off state, then the system controller 24 acquires the button operation as an "on instruction."

If the system controller 24 acquires an on instruction, then it notifies the sub system 50, which is in an active state, of a result of the detection and turns off the standby LED 22 while it turns on the power ON LED 21. At this time, the sub system 50 starts up the main system 60 and itself enters a standby mode. On the other hand, if the system controller 24 acquires an off instruction, then it notifies the main system 60, which is in an active state, of a result of the detection and turns off the power ON LED 21 while it turns on the standby LED 22. At this time, the main system 60 starts up the sub system 50 and itself enters a standby mode.

While the main CPU has a function of executing a game program installed in the auxiliary storage apparatus 2, the sub CPU does not have the function. However, the sub CPU has a function of accessing the auxiliary storage apparatus 2 and another function of transferring information to and from the network server 5. The sub CPU is configured having only such limited processing functions and accordingly can operate with lower power consumption than the main CPU.

The clock 26 is a real time clock, and generates date and time information at present and supplies the generated information to the system controller 24, sub system 50 and main system 60.

The device controller 30 is configured as an LSI (Large-Scale Integrated Circuit) which executes delivery of information between devices like a south bridge. As depicted in FIG. 5, such devices as the system controller 24, media drive 32, USB module 34, flash memory 36, wireless communication module 38, wire communication module 40, sub system 50 and main system 60 are connected to the device controller 30. The device controller 30 absorbs a difference in electric characteristic, a difference in data transfer rate between the devices and controls the timing of data transfer.

The media drive 32 is a drive apparatus which operates a ROM medium 44, on which application software of a game or the like is recorded, loaded thereon to read out a program, data and so forth from the ROM medium 44. The ROM medium 44 is a read-only recording medium such as an optical disk, a magneto-optical disk or a Blu-ray disk.

The USB module 34 is a module to be connected to an external apparatus by a USB cable. The USB module 34 may be connected to the auxiliary storage apparatus 2 and the camera 7 by a USB cable. The flash memory 36 is an auxiliary storage apparatus which configures an internal storage. The wireless communication module 38 wirelessly communicates, for example, with the inputting apparatus 6 using a communication protocol such as a Bluetooth (registered trademark) protocol or an IEEE 802.11 protocol. It is to be noted that the wireless communication module 38 may be compatible with a third generation (3rd Generation) digital portable telephone system compliant with the IMT-2000 (International Mobile Telecommunication 2000) standard prescribed by the ITU (International Telecommunication Union). The wire communication module 40 wire-communicates with an external apparatus and is connected to the network 3, for example, through the AP 8.

The main system 60 includes a main CPU, a memory which is a main storage apparatus and a memory controller, a GPU (Graphics Processing Unit) and so forth. The GPU is utilized principally for arithmetic processing of a game program. Those functions may be configured as a system-on-chip and formed on one chip. The main CPU has a function of starting up system software and executing an application installed in the auxiliary storage apparatus 2 under an environment provided by the system software.

The sub system 50 includes a sub CPU, a memory which is a main storage apparatus, a memory controller and so forth but does not include a GPU. The number of circuit gates of the sub CPU is smaller than the number of circuit gates of the main CPU, and the operation power consumption of the sub CPU is lower than that of the main CPU. As described hereinabove, the sub CPU operates while the main CPU is in a standby state, and the processing functions of the sub CPU are limited in order to suppress the power consumption of the sub CPU low. It is to be noted that the sub CPU and the memory may be formed on chips separate from each other.

Figure 6:
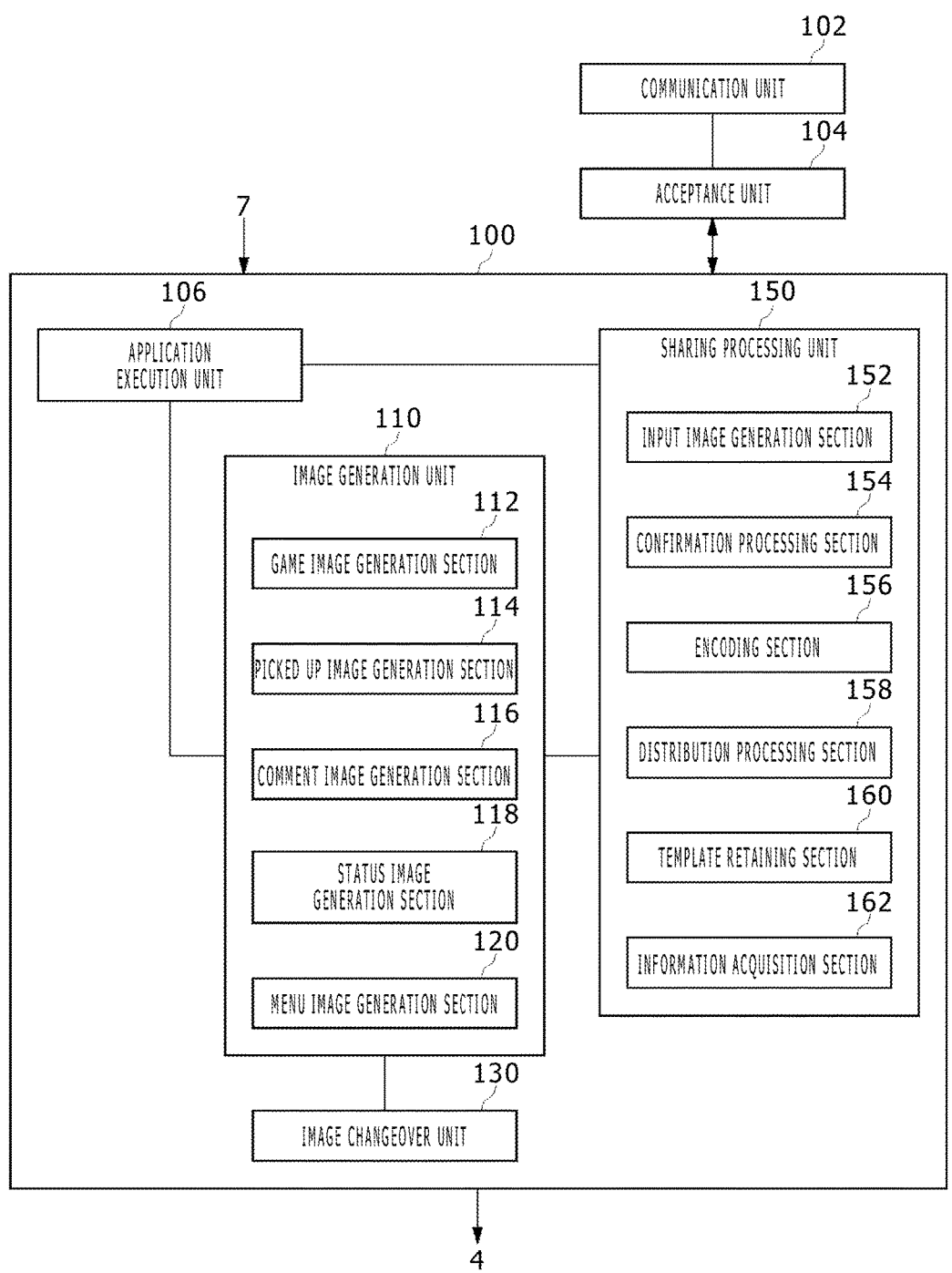
FIG. 6 is a diagram depicting an internal configuration of the information processing apparatus which operates as a distribution apparatus of streaming data.

FIG. 6 depicts an internal configuration of the information processing apparatus 10 which operates as a distribution apparatus of streaming data. The information processing apparatus 10 includes a processing part 100, a communication unit 102 and an acceptance unit 104. The processing part 100 includes an application execution unit 106, an image generation unit 110, an image changeover unit 130 and a sharing processing unit 150.

The image generation unit 110 generates image data to be displayed on the outputting apparatus 4 and includes a game image generation section 112, a picked up image generation section 114, a comment image generation section 116, a status image generation section 118 and a menu image generation section 120. Each of the game image generation section 112, picked up image generation section 114, comment image generation section 116 and status image generation section 118 generates image data to be displayed in a live distribution layout and displays a live distribution image on the outputting apparatus 4. The menu image generation section 120 generates menu image data in which icon images of games or applications are arrayed and displays the menu image data on the outputting apparatus 4. The image changeover unit 130 changes over an image to be displayed on the outputting apparatus 4 between a menu image and a live distribution image.

The sharing processing unit 150 carries out a process of transmitting live distribution image data generated by the image generation unit 110 to the sharing server 9 so that a live distribution image is shared with a different user. The sharing processing unit 150 includes an input image generation section 152, a confirmation processing section 154, an encoding section 156, a distribution processing section 158, a template retaining section 160 and an information acquisition section 162.

The components represented as functional blocks which carry out various processes in FIG. 6 can be configured, in hardware, from a circuit block, a memory and other LSIs, and is implemented, in software, by a program and so forth loaded in the memory. Accordingly, it can be recognized by those skilled in the art that the functional blocks can be implemented in various forms only from hardware, only from software or from a combination of hardware and software and are not limited to any of them.

In the information processing system 1 of the present embodiment, the communication unit 102 receives information that an inputting unit of the inputting apparatus 6 is operated by a user (such information is hereinafter referred to as "operation information"). Further, the communication unit 102 transmits a content generated by the processing part 100 to the sharing server 9. Here, the content is a live distribution image generated by the image generation unit 110. The communication unit 102 is represented as a configuration having both of functions of the wireless communication module 38 and the wire communication module 40 depicted in FIG. 5.

The acceptance unit 104 is provided between the communication unit 102 and the processing part 100 and transmits data or information to and from the communication unit 102 and the processing part 100. If the acceptance unit 104 accepts operation information of an inputting unit provided in the inputting apparatus 6 through the communication unit 102, then it supplies the operation information to one, two or more of the application execution unit 106, image generation unit 110, image changeover unit 130, and sharing processing unit 150 of the processing part 100.

If the main power supply button 20 is depressed by the user in a state in which the main power supply to the information processing apparatus 10 is off, then the main system is started up. The main system 60 supplies a generation instruction of a menu image to the menu image generation section 120, and the menu image generation section 120 generates a menu image in which icon images of applications and the like are arrayed and outputs the menu image to the outputting apparatus 4. It is to be noted that the menu image generation section 120 may generate a menu image when the user depresses the function button 80 of the inputting apparatus 6 in a state in which the main power supply to the information processing apparatus 10 is on. The function of the menu image generation section 120 is implemented by system software.

Figure 7:
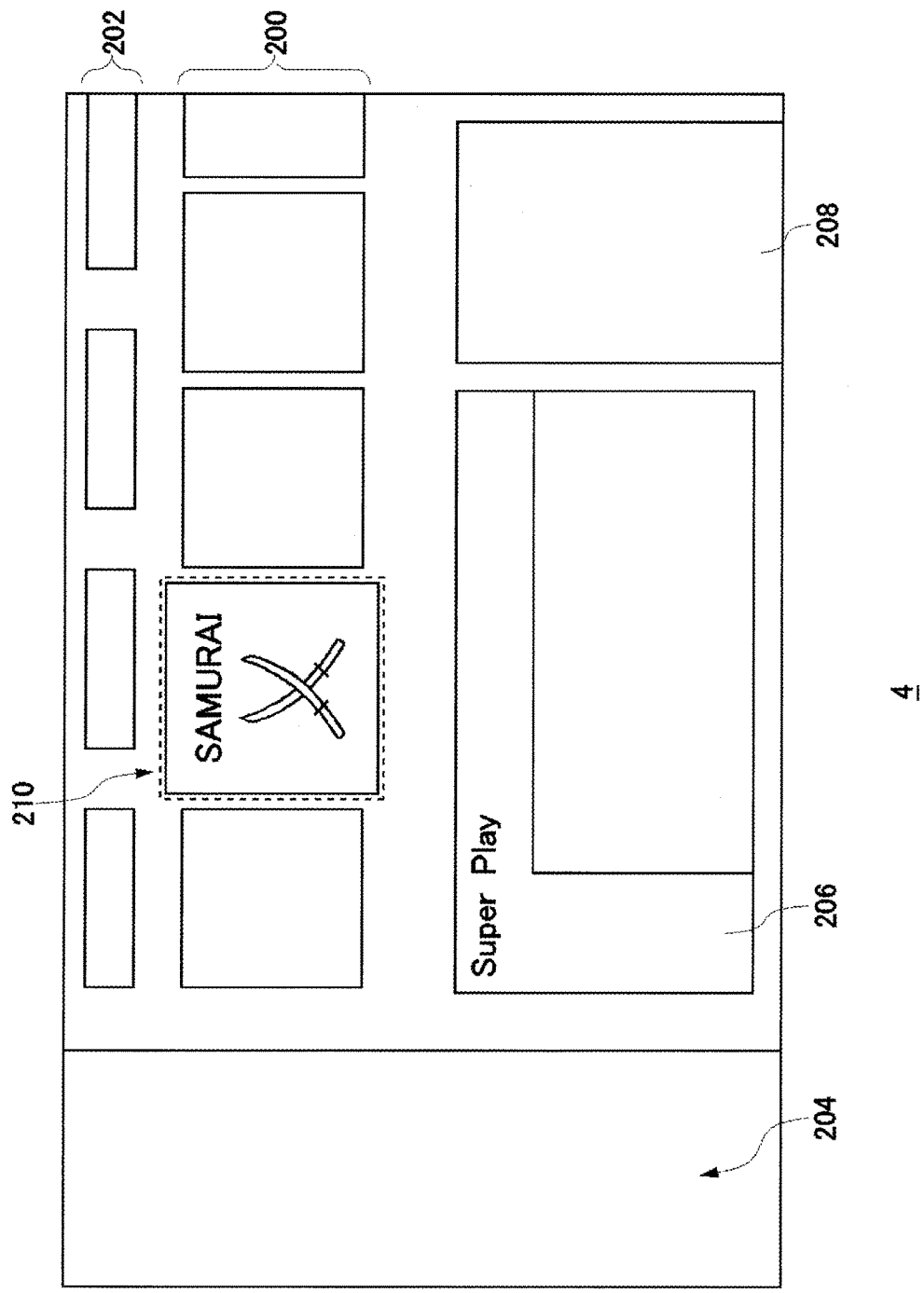
FIG. 7 is a diagram depicting an example of a menu screen image displayed on an outputting apparatus.

FIG. 7 depicts an example of a menu screen image displayed on the outputting apparatus 4. The menu screen image is displayed when the user is to select a game to be played or when the user browses activities of other users. In a category selection region 204, categories of menus prepared in the information processing apparatus 10 are displayed. In a game icon display region 200, icons of games which can be played by a log-in user and icons of applications which can be executed are displayed in a list in a horizontal direction of the screen. The user can operate the inputting apparatus 6 to scroll the list rightwardly or leftwardly. In the game icon display region 200, a focus region 210 is set at a predetermined position, and if a game icon in which the user is interested is placed into the focus region 210, then icons relating to the game are displayed in a relating icon display region 202 and relating information is displayed in relating information display regions 206 and 208. If the user operates an inputting unit of the inputting apparatus 6 to place the icon of a game to be played into the focus region 210 and then depresses a predetermined determination key, then the acceptance unit 104 depicted in FIG. 6 accepts the operation information as a game execution command. Thus, the application execution unit 106 executes the game.

In the relating information display region 206, relating information to the game placed in the focus region 210 is displayed, and, for example, a moving picture relating to the game is displayed. The moving picture displayed may be a play moving picture of the game accumulated in the sharing server 9 or a live moving picture distributed from the sharing server 9. In the relating information display region 208, relating information to the game placed in the focus region 210 is displayed, and, for example, a list of friends who are playing the game may be displayed. The menu image generation section 120 generates such a menu screen image and displays the menu screen image from the outputting apparatus 4.

If an execution command of a game is inputted by the user, then the application execution unit 106 executes a program of the game placed in the focus region 210. In the present example, a game of the title "SAMURAI" is started.

Figure 8:
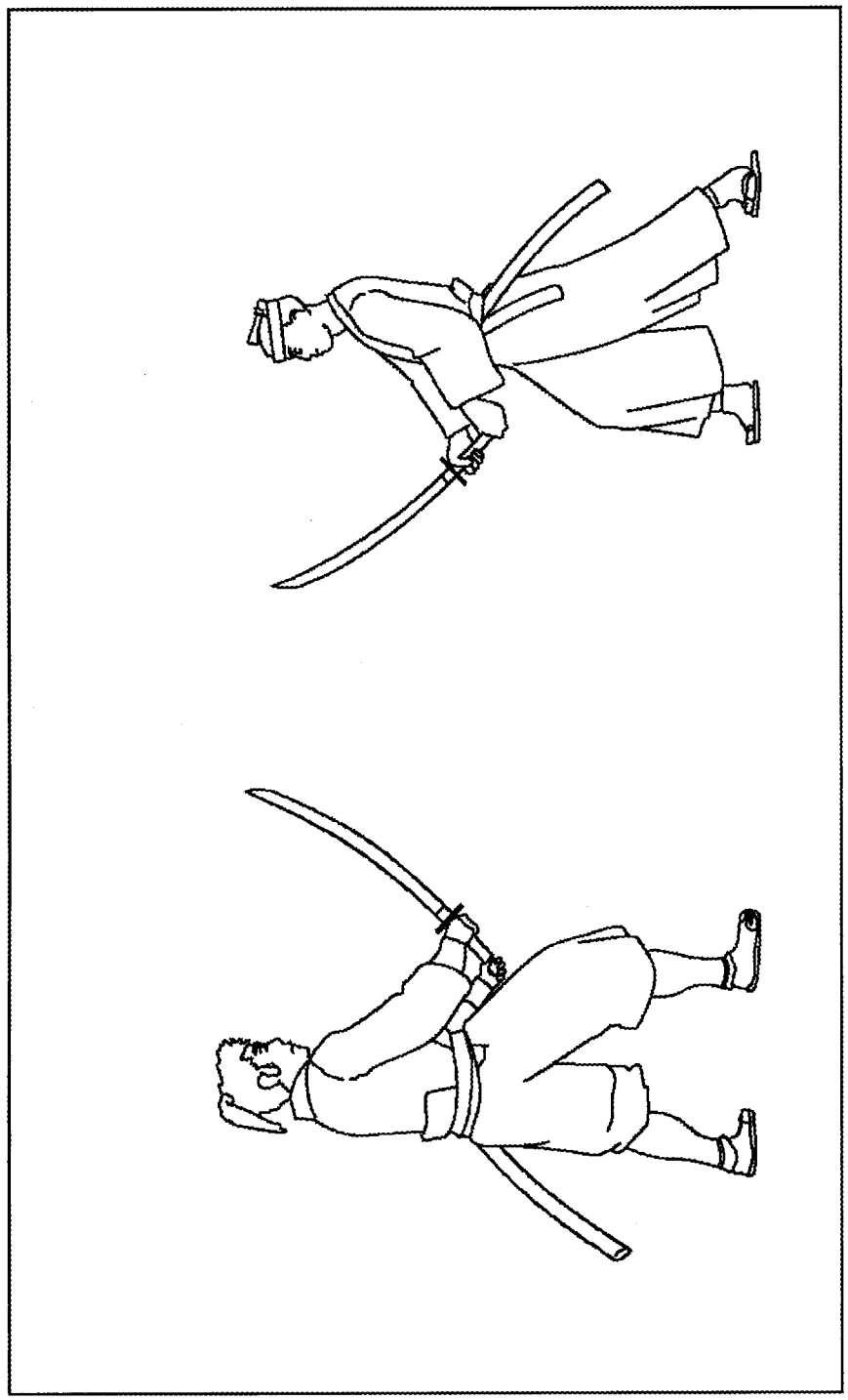
FIG. 8 is a diagram depicting an example of a game screen image displayed on the outputting apparatus.

While the application execution unit 106 in the present embodiment executes a game program, it may otherwise execute a different kind of an application program. The application execution unit 106 carries out arithmetic operation processing for moving a game character in a virtual space based on operation information inputted to the inputting apparatus 6 from the user. Here, the application execution unit 106 may be an application (game program) itself. The game image generation section 112 may be a GPU (Graphics Processing Unit) which executes a rendering process or the like, and receives a result of processing by the application execution unit 106 and generates image data of the application (game) to be displayed on the outputting apparatus 4. FIG. 8 depicts an example of a game screen image displayed on the outputting apparatus 4.

The sharing processing unit 150 in the present embodiment provides a mechanism for sharing game image data generated by the image generation unit 110 with other users. This sharing process is executed taking it as a trigger that a particular inputting unit provided on the inputting apparatus 6 is operated by the user.

Referring back to FIGS. 2 and 3, a plurality of inputting units provided on the inputting apparatus 6 can be classified into three types from a point of view of inputting of operation information to the information processing apparatus 10.

(First Type)

An inputting unit of the first type is configured to input operation information to the system software of the information processing apparatus 10, and particularly, the function button 80 and the SHARE button 81 belong to the first type. Operation information of the function button 80 and the SHARE button 81 is provided only to the system software but is not provided to the application software. Here, the system software signifies software for managing/controlling the hardware of the computer of the information processing apparatus 10 to support work or use of the information processing apparatus 10. Meanwhile, the application software signifies software which directly has a function of carrying out a work to be executed by the user in an environment constructed by the system software. Representatively, the system software includes the OS, and the application software includes game software.

(Second Type)

An inputting unit of the second type is configured to input operation information to the application software of the information processing apparatus 10, and particularly, the OPTION button 82 belongs to the second type. Operation information of the OPTION button 82 is provided only to the application software but is not provided to the system software.

(Third Type)

An inputting unit of the third type is configured to input operation information to any of the system software and the application software of the information processing apparatus 10, and particularly, the direction key 71, operation buttons 76, analog sticks 77, upper side buttons 83 and lower side buttons 84 belong to the third type. During display of a menu screen image (refer to FIG. 7) generated by the system software, operation information of an inputting unit of the third type is provided to the system software. However, during display of a game screen image (refer to FIG. 8) generated by the application software, operation information of an inputting unit of the third type is provided to the application software. In this manner, operation information of an inputting unit of the third type is provided to a generation entity of a screen image displayed on the outputting apparatus 4.

If the acceptance unit 104 accepts operation information of an inputting unit of the first type, particularly, of the SHARE button 81, from among the inputting units of the three types, then the sharing processing unit 150 carries out a process of sharing image data generated by the image generation unit 110 or information relating to the image data with a different user. This sharing process is not carried out when the acceptance unit 104 accepts operation information of an inputting unit of the second type or the third type, but is carried out absolutely only when operation information of an inputting unit of the first type is accepted.

In the following, a sharing process when the user operates the SHARE button 81 during display of the game screen image depicted in FIG. 8 is described.

The input image generation section 152 generates an inputting image indicative of choices relating to sharing of image data. On the input screen image displayed on the outputting apparatus 4, a GUI (Graphical User Interface) for inputting predetermined information through an operation of the inputting apparatus 6 by the user, a text inputting field and so forth are disposed. In the following description, data provided to the sharing server 9 is sometimes referred to as "content." On the inputting image, a GUI for selecting a content which is to make an object of a sharing process is displayed.

Figure 9:
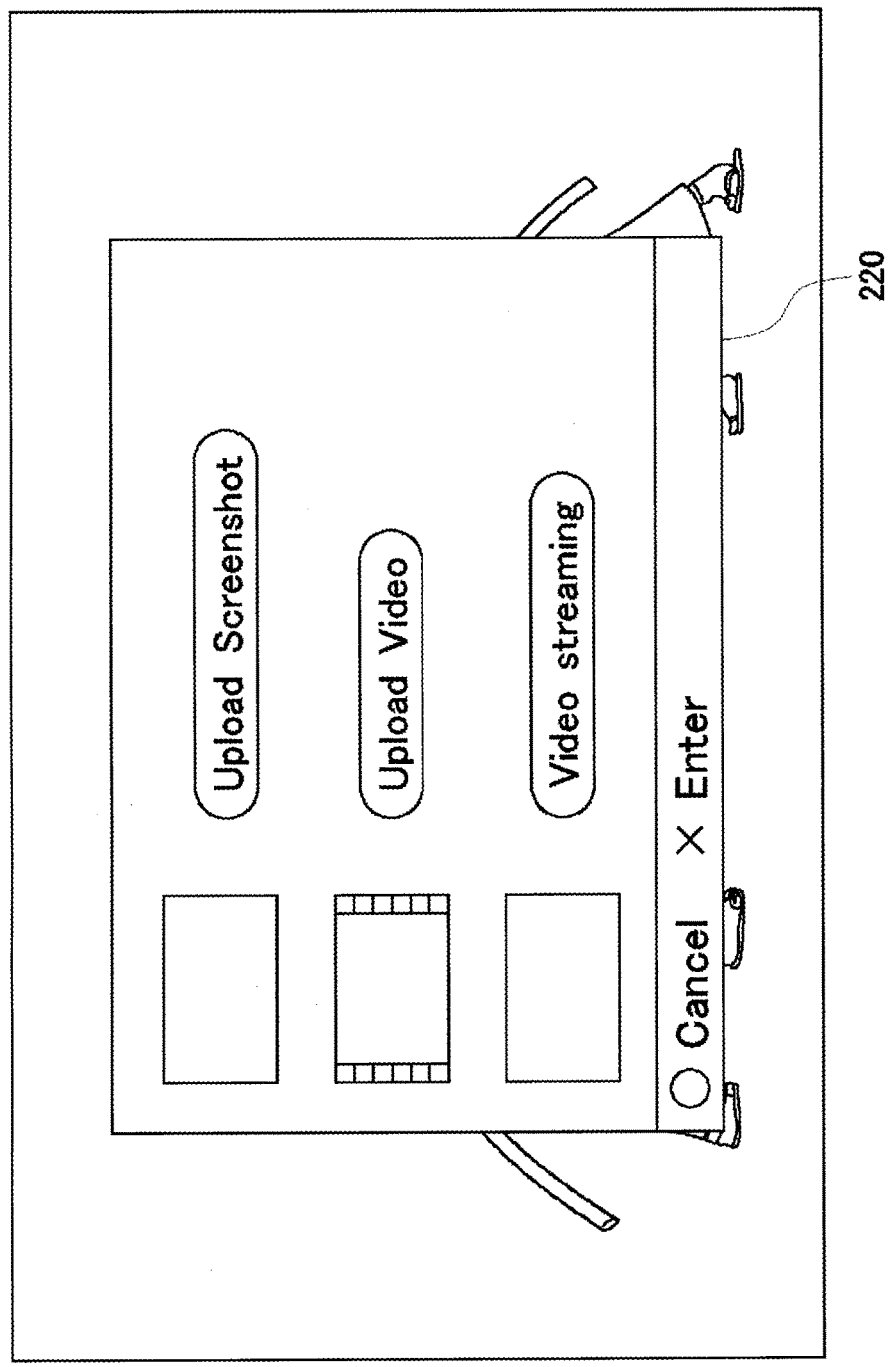
FIG. 9 is a diagram depicting an example of an inputting screen image displayed in an overlapping relationship on the game screen image.

FIG. 9 depicts an example of an input screen image displayed in an overlapping relationship on a game screen image. On the input screen image 220, three choices relating to content sharing are presented. "Upload Screenshot" is a GUI which designates uploading of image data of a screenshot; "Upload Video" is a GUI which designates uploading of image data recorded in a ring buffer in the information processing apparatus 10; and "Video Streaming" is a GUI which designates live relaying of a play video of the game. The user would operate the inputting apparatus 6 to select one of the GUIs and depress the Enter key to execute the selected sharing process.

Figure 10:
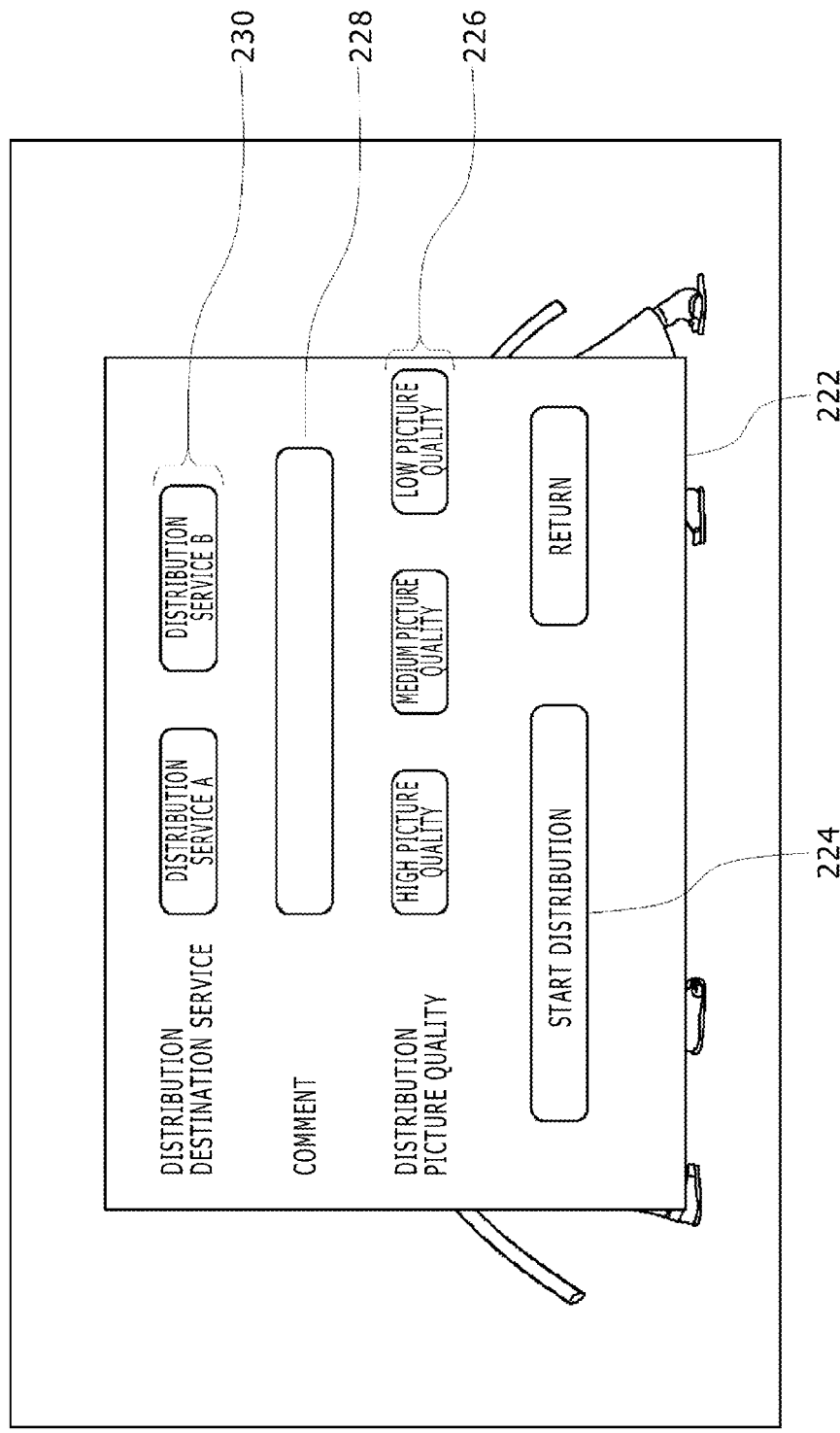
FIG. 10 is a diagram depicting an example of an inputting screen image displayed in an overlapping relationship on the game screen image when "Video Streaming" is selected.

FIG. 10 depicts an example of an input screen image displayed in an overlapping relationship on a game screen image when the "Video Streaming" is selected. On the input screen image 222, choices relating to sharing of a content are indicated, and here, a service selection field 230 for inputting information regarding which one of content sharing services provided by a plurality of sharing servers 9 is to be selected is indicated. In this example, two choices of a distribution service A and another distribution service B are presented. Although the distribution services may be operated by different business entities, they may otherwise be operated by a single business entity, by which different kinds of services may be provided.

The user can input a comment relating to a live distribution image in the form of a text. The inputted comment may be displayed together with a thumbnail image of the content on the sharing site. Since it is expected that the interest of a different user in the content is raised by browsing the comment displayed on the sharing site, inputting of the command has important implications in the sharing service. It is to be noted that the inputted comment may be transmitted not only to a site of a service selected through the service selection field 230 but also to a site, for example, of an SNS so that it can be browsed by other users together with information of the URL or the like of the sharing service which carries out content distribution. This makes it possible for the other users to recognize that a content has been distributed and makes it possible to access the sharing server 9 readily.

A picture quality selection field 226 indicates choices for selecting picture quality of streaming data to be distributed. In the present example, three kinds of picture quality including "high picture quality," "medium picture quality" and "low picture quality" are presented. However, "highest picture quality" may be added to the kinds of picture quality so that picture quality can be selected from among the four kinds of picture quality. If the user selects a distribution service and distribution picture quality using the inputting apparatus 6 and inputs a comment and then selects a distribution starting button 224, then the distribution processing section 158 carries out a connection process to the sharing server 9 which provides the selected distribution service. It is to be noted that, while the inputting screen image depicted in FIG. 10 is configured such that a distribution destination service and distribution picture quality can be selected and a comment can be inputted, choices regarding whether or not microphone sound or a picked up image of the camera 7 is to be included in distribution or regarding whether or not a comment from a viewing user is to be displayed may be included additionally.

If connection between the information processing apparatus 10 and the sharing server 9 is established, then the image generation unit 110 generates a live distribution image in accordance with the template retained in the template retaining section 160. The live distribution image is outputted to and displayed on the outputting apparatus 4 and is encoded by the sharing processing unit 150 and then distributed to the sharing server 9. It is to be noted that, although, in the information processing system 1 of the present embodiment, a live distribution image is distributed to the information processing apparatus 14 of the viewer through the sharing server 9, the information processing apparatus 10 and the information processing apparatus 14 may establish connection therebetween so that a live distribution image is distributed from the information processing apparatus 10 to the information processing apparatus 14 without the intervention of the sharing server 9.

Figure 11:
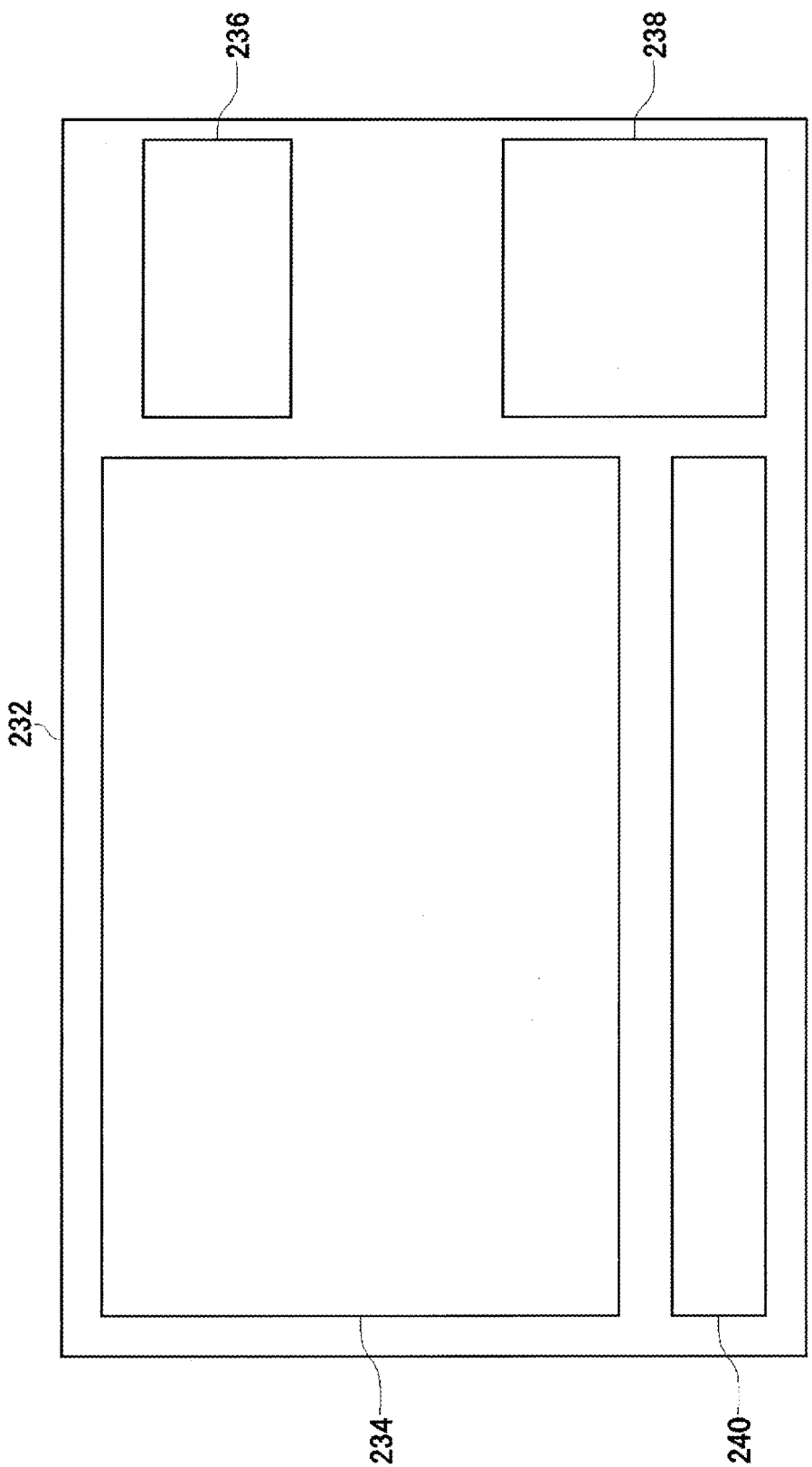
FIG. 11 is a diagram depicting an example of a template retained in a template retaining section.

FIG. 11 depicts an example of the template retained in the template retaining section 160. A template 232 defines a display layout of the entire display of the outputting apparatus 4. In an image display region 234, a game image is displayed. In a status display region 236, a distribution status is displayed. In a picked up image display region 238, a picked up image of the camera 7 is displayed. In a comment display region 240, a comment from a different user is displayed. The image generation unit 110 generates images in the display regions to generate live distribution image data. It is to be noted that the template 232 depicted in FIG. 11 is an example, and a template equivalent to the template 232 from which the comment display region 240 is excluded, another template equivalent to the template 232 from which the picked up image display region 238 is excluded, a further template equivalent to the template 232 from which the picked up image display region 238 and the comment display region 240 are excluded and some other template may be retained in the template retaining section 160. The image generation unit 110 reads out a template to be used from the template retaining section 160 in accordance with information inputted through the input screen image 222 depicted in FIG. 10.

Figure 12:
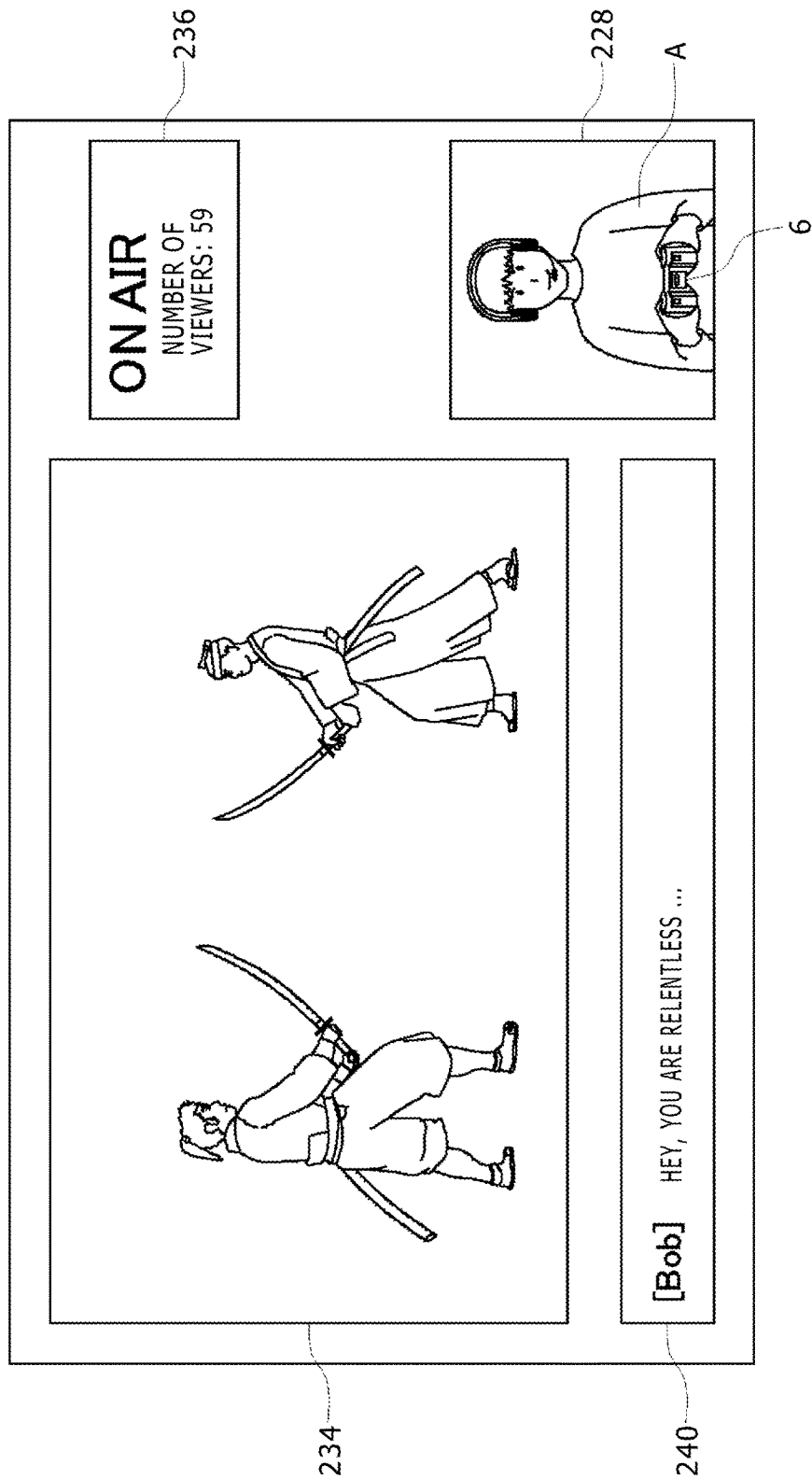
FIG. 12 is a diagram depicting an example of a live distribution screen image displayed on the outputting apparatus.

FIG. 12 depicts an example of a live distribution screen image displayed on the outputting apparatus 4. The image generation unit 110 generates live distribution image data including a game image in accordance with the template 232 and outputs the live distribution image data to the outputting apparatus 4 and the sharing processing unit 150. The encoding section 156 encodes the live distribution image data into data of a streaming format, and the distribution processing section 158 transmits the encoded streaming data to the sharing server 9. This makes it possible for the information processing apparatus 14 of a viewing user to access the sharing server 9 and display a live distribution image provided from the information processing apparatus 10 on the outputting apparatus 15. The sharing server 9 manages the viewing situation of the live distribution image and notifies the information processing apparatus 10 of the viewing situation. Further, the sharing server 9 transmits a comment transmitted thereto from the information processing apparatus 14 to the information processing apparatus 10. In the information processing apparatus 10, the information acquisition section 162 acquires information relating to the live distribution image data such as the viewing situation and the comment.

The game image generation section 112 generates game image data, and a game image is displayed in the image display region 234. The picked up image generation section 114 acquires a camera image from the camera 7 and generates picked up image data, and a picked up image is displayed in the picked up image display region 238. The comment image generation section 116 generates comment image data using comment data acquired by the information acquisition section 162, and a comment image is displayed in the comment display region 240. It is to be noted that the comment image generation section 116 may generate a comment image from one viewing user and successively generate comment image data with reference to a minimum display time period for a comment. For example, if the minimum display time period for a comment is set to three seconds and the information acquisition section 162 acquires a comment from the sharing server 9 after every predetermined interval of time (for example, once per one minute), then if a plurality of comments are acquired, then the comment image generation section 116 successively generates comment images for one minute. Consequently, new comment images are successively displayed in the comment display region 240. It is to be noted that, if the number of acquired comments is equal to or greater than 21, then if one comment is displayed for three seconds, then some comment cannot be displayed, and therefore, a comment or comments which cannot be displayed may be discarded. The status image generation section 118 generates status image data using a viewing situation acquired by the information acquisition section 162, and a status image is displayed in the status display region 236. It is to be noted that also the number of comments inputted from viewers may be displayed in the status display region 236. In this manner, the image generation unit 110 generates live distribution image data in accordance with the template 232.

The live distribution image at least includes a game image and images of information acquired by the information acquisition section 162. In the present example, as images of information acquired by the information acquisition section 162, a status image in the status display region 236 and a comment image in the comment display region 240 are included. A picked up image of the camera 7 may be or may not be included in the live distribution image depending upon a desire of the user. The encoding section 156 encodes live distribution image data generated by the image generation unit 110, and the distribution processing section 158 transmits the encoded live distribution image data to the sharing server 9 so that a viewer of the live distribution image can view a comment image or a status image same as that viewed by the user A who is the distributor. It is to be noted that, where a microphone is connected to the information processing apparatus 10, the distribution processing section 158 transmits also sound from the microphone to the sharing server 9 in synchronism with the live distribution image. Consequently, if the user A mentions an impression on the comment displayed in the comment display region 240, then also the voice of the impression is conveyed to the viewer. Accordingly, an environment in which it seems that the viewer and the distributor (user A) exist in the same space is implemented.

Figure 13:
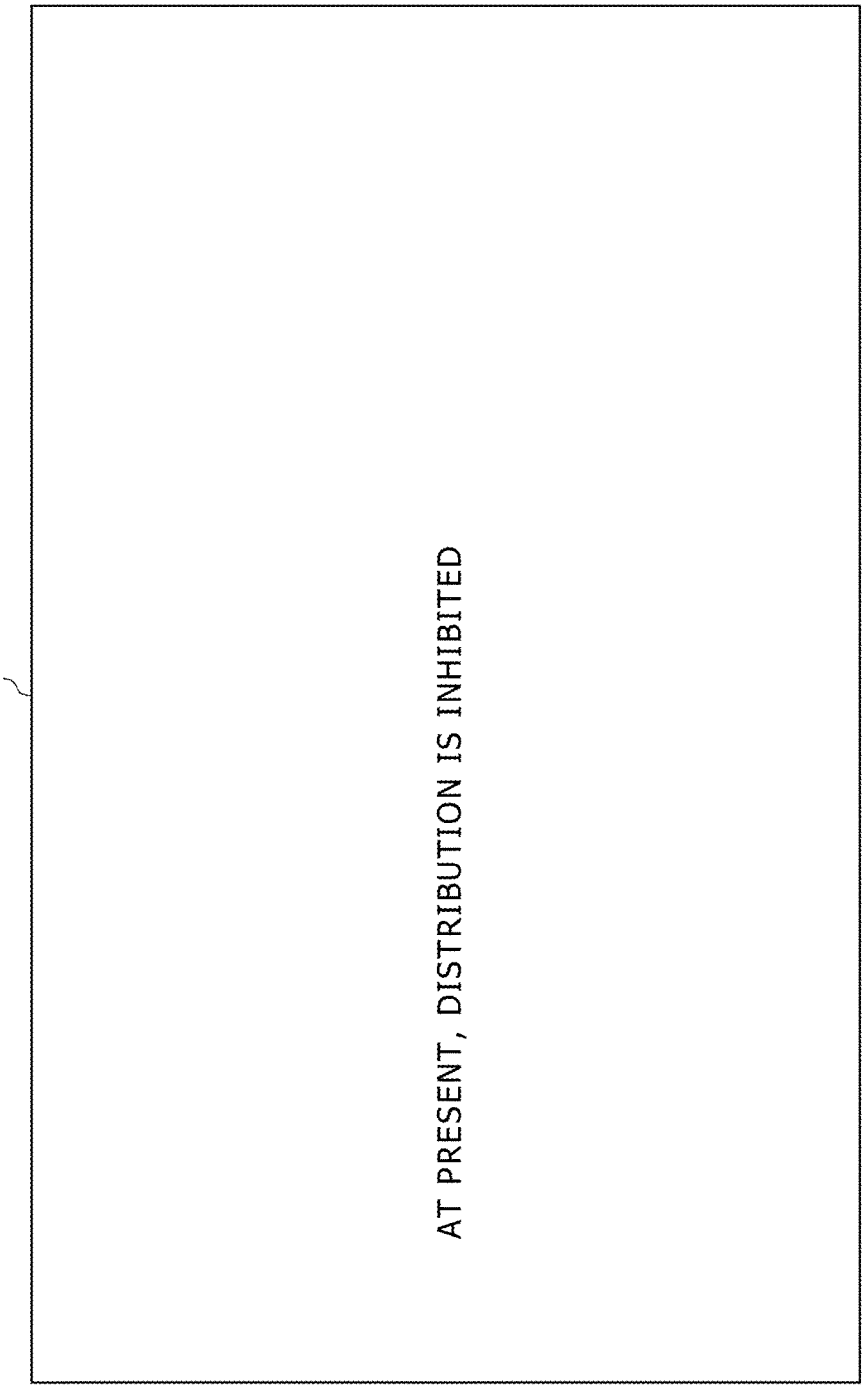
FIG. 13 is a diagram depicting an example of a message image.

It is to be noted that a game sometimes has embedded therein information which inhibits recording or distribution thereof in order to prevent revelation of the contents. For example, at a high point of a game such as a special stage or a fight scene against a boss character, information for inhibition of recording/distribution is set. In the following description, a scene or a stage at which recording/distribution is inhibited is referred to as "inhibition interval." The confirmation processing section 154 carries out confirmation of whether or not a game image may be distributed. If inhibition information is received from the game, then the confirmation processing section 154 confirms that distribution of game image data within the inhibition interval is not permitted and notifies the distribution processing section 158 of this. In response to the notification, the distribution processing section 158 stops distribution of the live distribution image and distributes a message image 250 depicted in FIG. 13 to the sharing server 9. In particular, the encoding section 156 stops encoding of a live distribution image and encodes the prescribed message image 250, and the distribution processing section 158 distributes the encoded message image. Consequently, on the outputting apparatus 4, the live distribution image depicted in FIG. 12 is displayed. Meanwhile, on the outputting apparatus 15 of the viewer, the message image 250 is displayed. If the confirmation processing section 154 detects an end of the inhibition interval, then the distribution processing section 158 resumes distribution of a live distribution image. It is to be noted that, when the distribution processing section 158 confirms inhibition of distribution of game image data, the image generation unit 110 may overwrite the game image data in the live distribution image data with the message image 250 such that the live distribution image data in which the game image is replaced with the message image 250 is distributed from the distribution processing section 158. It is to be noted that, within the inhibition interval, preferably the confirmation processing section 154 displays information representing the inhibition interval in the live distribution image displayed on the outputting apparatus 4 to notify the distribution user of the information.

If the user A depresses the function button 80 during distribution of a live distribution image, then the image changeover unit 130 changes over the image to be displayed on the outputting apparatus 4 to the menu image (refer to FIG. 7). It is to be noted that, if the user A depresses a predetermined button during display of the menu image, then the image changeover unit 130 changes over the image to be displayed on the outputting apparatus 4 to the live distribution image. In this manner, the image changeover unit 130 has a function of changing over the image to be displayed on the outputting apparatus 4 between the menu image and the game image. It is to be noted that, also when the image changeover unit 130 changes over the live distribution image to the menu image, if the application execution unit 106 continues the game, then the game image generation section 112 may continue to generate a game image on the background.

Figure 14:
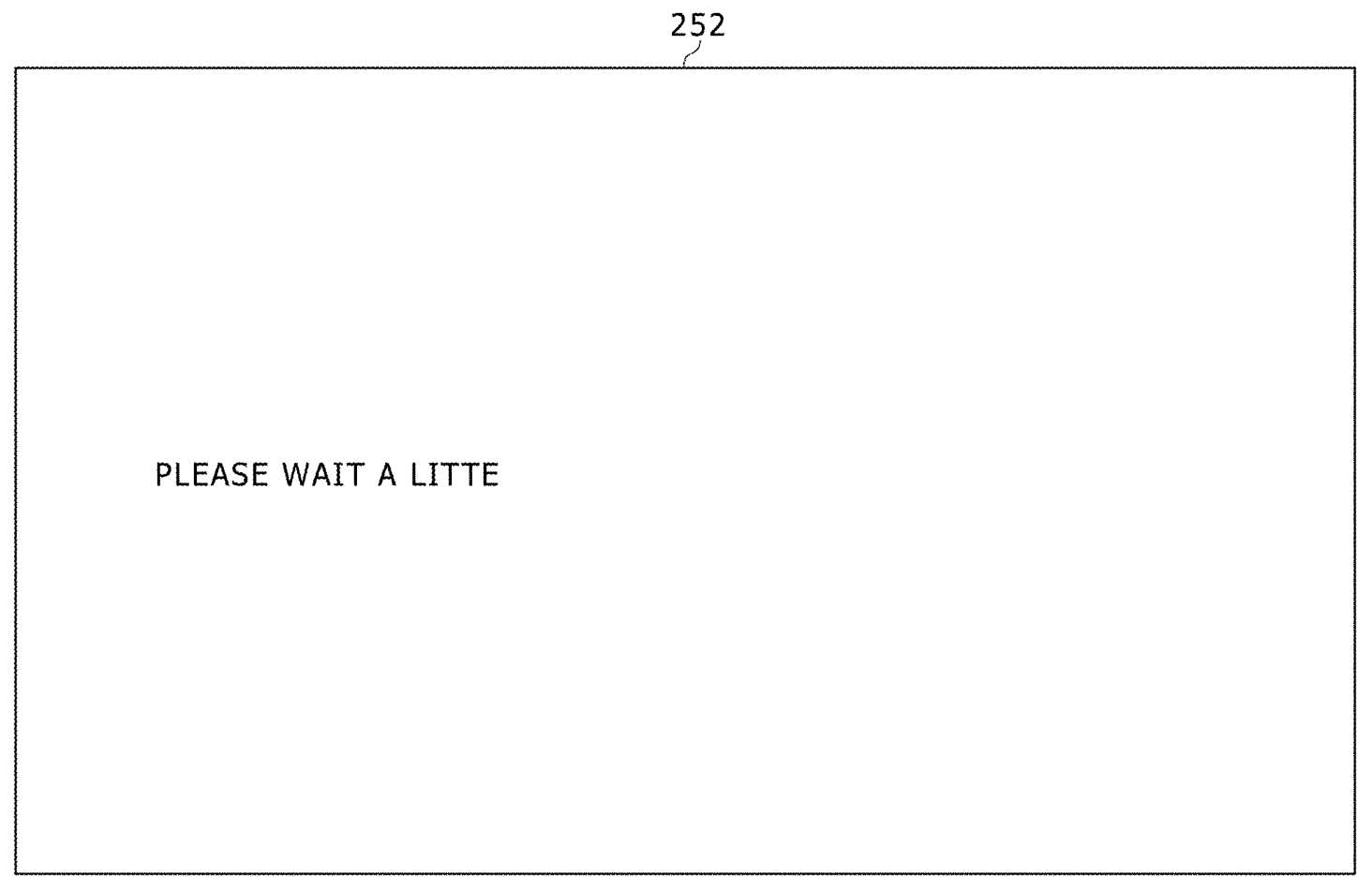

Although the distribution processing section 158 distributes a live distribution image including a game image to the sharing server 9, it does not distribute the menu image. In other words, when the menu image is displayed on the outputting apparatus 4, the distribution processing section 158 transmits image data which does not include the menu image to the sharing server 9. For example, FIG. 14 depicts a message image 252 which is transmitted to the sharing server 9 during display of the menu image, and the viewer will see a message "Please wait a little" until distribution of a live distribution image is resumed.

A configuration and operation of the information processing apparatus 10 which serves as a distribution source of streaming data have been described. Now, a configuration and operation of the information processing apparatus 14 which accesses the sharing server 9 to reproduce streaming data are described. It is to be noted that, although the information processing apparatus 14 may be a terminal apparatus which has a Web browser function such as a personal computer or a mobile terminal as described hereinabove, the following description is given of a case in which the information processing apparatus 14 is the information processing apparatus 10 which has the functional blocks depicted in FIG. 5. It is to be noted that a viewing user provides operation information to the information processing apparatus 14 using the inputting apparatus 6. In this manner, in the information processing system 1, the information processing apparatus 10 has a function that it operates as a distribution apparatus which distributes streaming data and operates also as a reproduction apparatus which reproduces streaming data.

Figure 15:
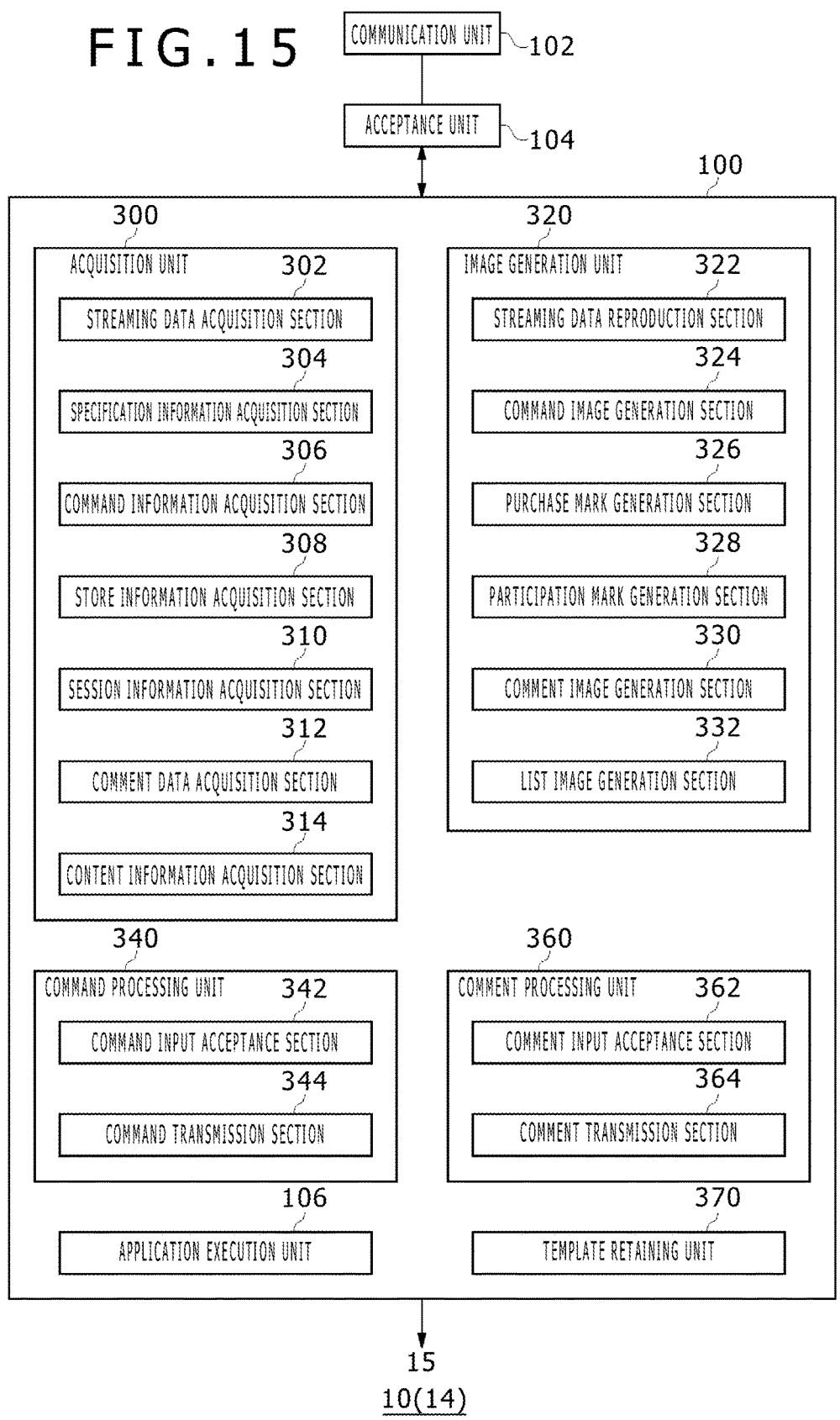
FIG. 15 is a diagram depicting an internal configuration of the information processing apparatus which operates as a reproduction apparatus of streaming data.

FIG. 15 depicts an internal configuration of the information processing apparatus 10 which operates as a reproduction apparatus of streaming data. The information processing apparatus 10 includes a processing part 100, a communication unit 102 and an acceptance unit 104. The processing part 100 includes an application execution unit 106, an acquisition unit 300, an image generation unit 320, a command processing unit 340, a comment processing unit 360 and a template retaining unit 370. It is to be noted that, when the information processing apparatus 10 operates as a reproduction apparatus, the application execution unit 106 starts up a viewing application of a live distribution image. As the viewing application is started up, the functions of the acquisition unit 300, image generation unit 320, command processing unit 340 and comment processing unit 360 are implemented.

The acquisition unit 300 acquires various kinds of information and data from various servers existing on the network 3. The acquisition unit 300 includes a streaming data acquisition section 302, a specification information acquisition section 304, a command information acquisition section 306, a store information acquisition section 308, a session information acquisition section 310, a comment data acquisition section 312 and a content information acquisition section 314. The image generation unit 320 generates image data for being displayed on the outputting apparatus 15 and includes a streaming data reproduction section 322, a command image generation section 324, a purchase mark generation section 326, a participation mark generation section 328, a comment image generation section 330 and a list image generation section 332. The command processing unit 340 includes a command input acceptance section 342 and a command transmission section 344, and the comment processing unit 360 includes a comment input acceptance section 362 and a comment transmission section 364.

The components represented as functional blocks which carry out various processes in FIG. 15 can be configured, in hardware, from a circuit block, a memory and other LSIs, and is implemented, in software, by a program and so forth loaded in the memory. Accordingly, it can be recognized by those skilled in the art that the functional blocks can be implemented in various forms only from hardware, only from software or from a combination of hardware and software and are not limited to any of them.

The communication unit 102 receives data and information transmitted from the servers and receives operation information representative of an operation of an inputting unit of the inputting apparatus 6 by the user. Further, the communication unit 102 transmits a command or a comment generated by the processing part 100 to an arbitrary server. The communication unit 102 is represented as a configuration which has both of functions of the wireless communication module 38 and the wire communication module 40 depicted in FIG. 5.

The acceptance unit 104 is provided between the communication unit 102 and the processing part 100 and transmits data or information to and from the communication unit 102 and the processing part 100. If the acceptance unit 104 accepts operation information of an inputting unit provided in the inputting apparatus 6 through the communication unit 102, then it supplies the operation information to one, two or more of the acquisition unit 300, image generation unit 320, command processing unit 340, comment processing unit 360 and application execution unit 106 of the processing part 100.

In the menu screen image depicted in FIG. 7, an icon of a viewing application of a live distribution image is placed in the focus region 210, and if the user depresses the predetermined determination key of the inputting apparatus 6, then the acceptance unit 104 depicted in FIG. 15 accepts the operation information as an application startup command and the application execution unit 106 executes the viewing application. When the viewing application is executed, the functions of the acquisition unit 300, image generation unit 320, command processing unit 340 and comment processing unit 360 are implemented. When the viewing application is started up, the information processing apparatus 10 establishes connection to the sharing server 9, and the image generation unit 320 generates a list of contents streaming distributed from the sharing server 9. It is to be noted that the connection between the information processing apparatus 10 and the sharing server 9 may be carried out by the viewing application or may be carried out manually by the user.

Figure 16:
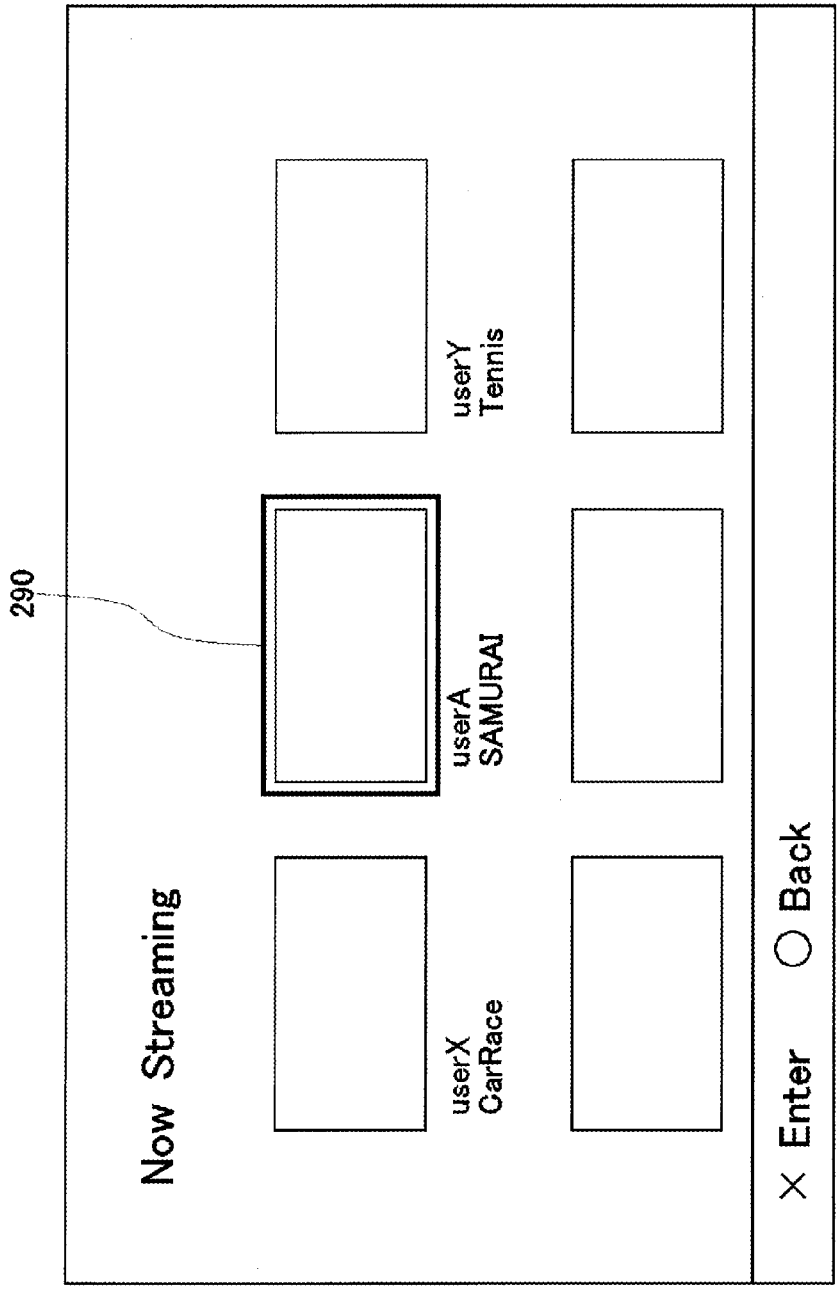
FIG. 16 is a diagram depicting a list screen image of contents.

FIG. 16 depicts a list screen image of contents. When the viewing application is started up, the content information acquisition section 314 acquires information of contents being live distributed from the sharing server 9. The information of contents includes, for example, thumbnail images of application videos being distributed, information for specifying distributors, information for specifying applications and comment data and may be information registered as attribute information of the contents in the sharing server 9. The list image generation section 332 uses the content information acquired by the content information acquisition section 314 to generate a list screen image in which the thumbnail images, distributor names and game titles are juxtaposed. The user would operate the inputting apparatus 6 to move a focus frame 290 to place the focus frame 290 at a thumbnail image to be viewed. In the example depicted in FIG. 16, the focus frame 290 is placed at the thumbnail image of the game title "SAMURAI" which is being distributed by the user A.

The streaming data acquisition section 302 transmits information for specifying the content at which the focus frame 290 is placed to the sharing server 9, and the sharing server 9 distributes streaming data specified by the content specification information to the information processing apparatus 10. The streaming data reproduction section 322 decodes and reproduces the streaming data, and consequently, a live video is displayed in the region in which the focus frame 290 is placed. By moving and placing the focus frame 290 to and at a thumbnail image, the user can view the live video of the content corresponding to the thumbnail image. It is to be noted that, after the focus frame 290 is placed at a thumbnail image, the list image generation section 332 may display information of a comment or the like in the proximity of the focus frame 290. If the user depresses the Enter key of the inputting apparatus 6, a viewing screen image of the content at which the focus frame 290 is placed is displayed. The image generation unit 320 generates viewing image data in accordance with a template retained in the template retaining unit 370 and outputs the viewing image data to the outputting apparatus 15.

Figure 17:
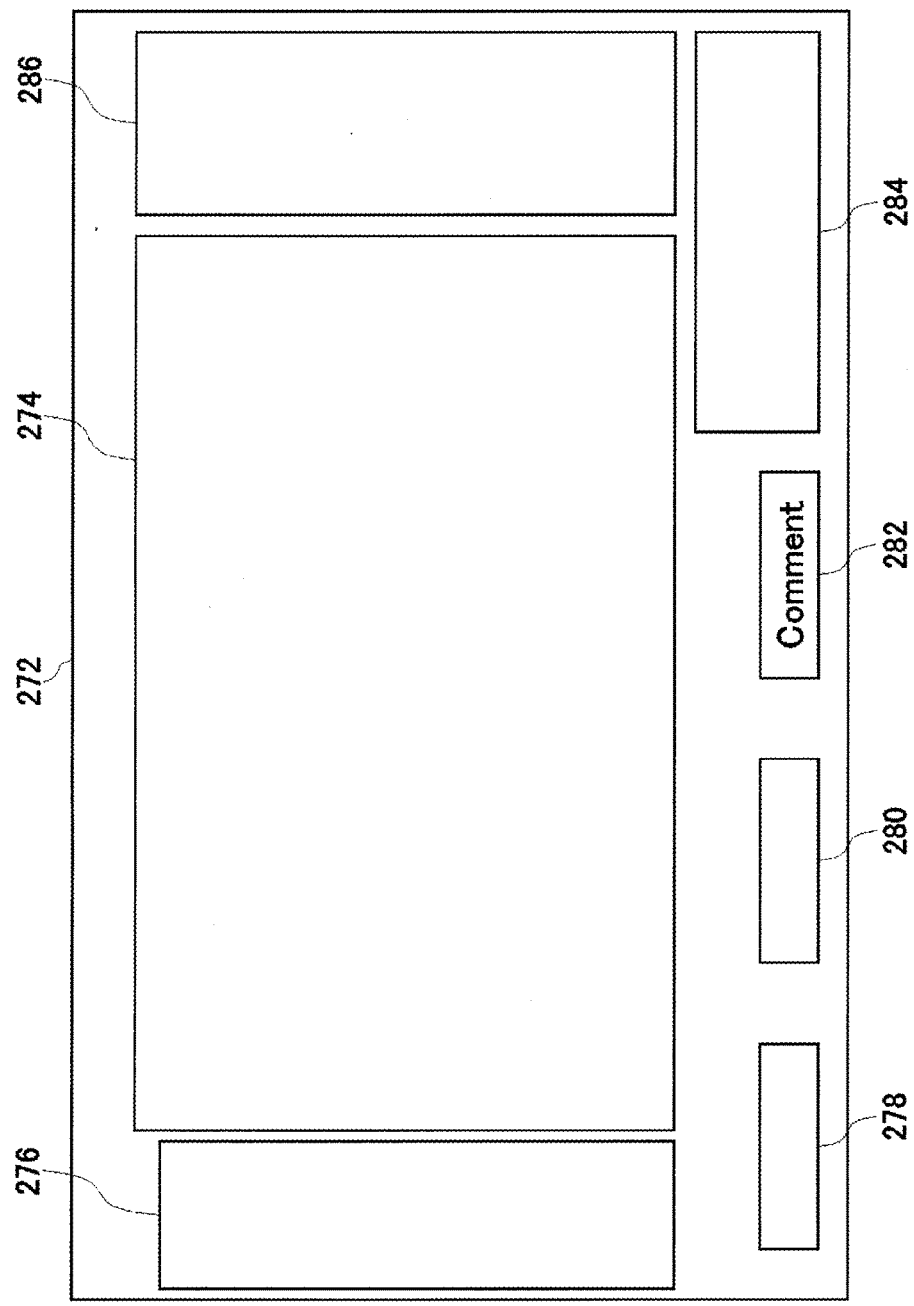
FIG. 17 is a diagram depicting another example of a template retained in the template retaining section.

FIG. 17 depicts an example of a template retained in the template retaining unit 370. A template 272 defines a display layout of the entire display of the outputting apparatus 15. In a live video display region 274, a live video is displayed. In a command image display region 276, a command image for inputting a command to an application being played by the distributor is displayed. In a participation mark display region 278, a participation mark for inputting a participation request to the application being played by the distributor is displayed. In a purchase mark display region 280, a purchase mark for inputting a purchase request to the application being played by the distributor is displayed. A comment input field 284 is a region into which the viewing user is to input a comment in the form of a text, and if a comment mark displayed in a comment mark display region 282 is selected, then a comment inputted to the comment input field 284 is transmitted to the information processing apparatus 10 of the distribution user A through the sharing server 9. A comment display region 286 is a region in which a comment from a viewing user who is viewing the content is displayed.

Figure 18:
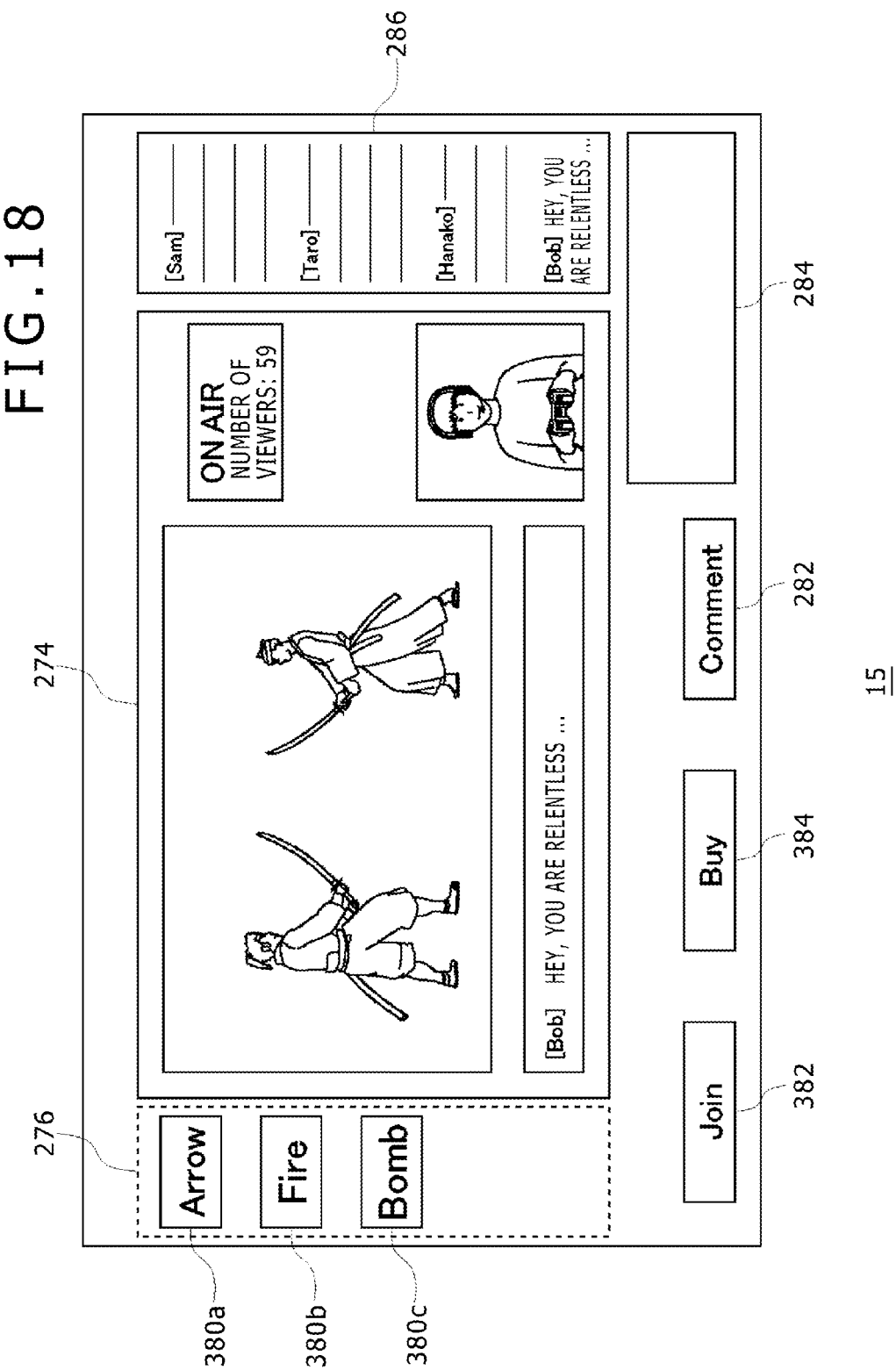
FIG. 18 is a diagram depicting an example of a viewing screen image displayed on the outputting apparatus.

FIG. 18 depicts an example of a viewing screen image displayed on the outputting apparatus 15. The image generation unit 320 generates viewing image data including a live video in accordance with the template 272 and outputs the viewing image data to the outputting apparatus 15. The streaming data acquisition section 302 acquires streaming data including a game image distributed from the sharing server 9. The streaming data reproduction section 322 decodes the acquired streaming data to reproduce a live video, and the reproduced live video is displayed on the live video display region 274.

The specification information acquisition section 304 acquires specification information of a distributor who provides streaming data and specification information of an application. It is to be noted that the specification information acquisition section 304 may be replaced by the content information acquisition section 314 described hereinabove or may receive distributor specification information of a content to be viewed and application specification information from the content information acquisition section 314.

The command information acquisition section 306 acquires command information to an application based on application specification information. The command information is data necessary to display information (image) for specifying a command in the command image display region 276 and may be, for example, a widget for displaying a GUI button. The game "SAMURAI" being executed in the information processing apparatus is configured such that a command from an external user is accepted and reflected on processing of the application. Here, the external user need not have "SAMURAI" installed in the information processing apparatus 10 thereof, and in short, only if the external user is viewing a live video distributed from the sharing server 9, it can transmit a command to the game "SAMURAI." The viewing user need not necessarily utilize the information processing apparatus 10 which is a game apparatus, but preferably, also a user of a tablet terminal having a Web browser can transmit a command as hereinafter described.

The store information acquisition section 308 acquires information relating to purchase of an application based on application specification information. The information relating to purchase of an application may be an address (URI: Uniform Resource Identifier) on the store server 16 from which the game "SAMURAI" is sold.

The session information acquisition section 310 acquires session information based on distributor specification information. Here, the session information is generated when a distribution user permits participation of a different user into a game being played, and where participation is not permitted, no session information is generated. In the information processing system 1, when a distribution user permits participation of a different user, the game server 12 issues a session ID for specifying a session of the game. The session ID may be a URI for connection to the game server 12 which is utilized by the information processing apparatus 10 which is to participate in a session to carry out synchronous communication through the game server 12. Session information including an issued session ID and distribution user specification information is passed to the session server 11. The session server 11 accepts and manages session information from a plurality of game servers 12. Accordingly, the session information acquisition section 310 accesses the session server 11 to confirm whether the game being played by the distribution user permits participation, and where participation is permitted, the session information acquisition section 310 acquires session information.

Figure 19:
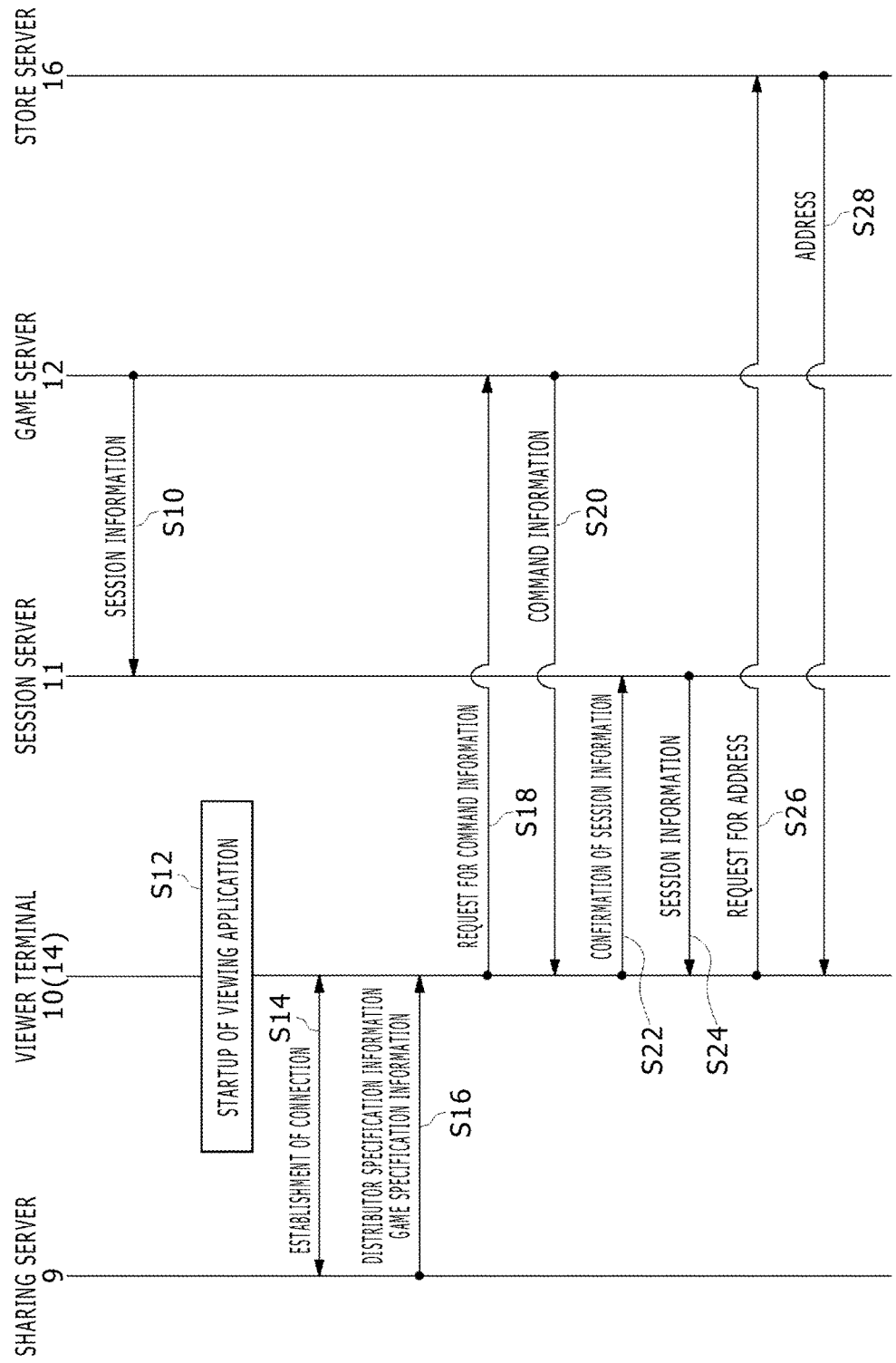
FIG. 19 is a diagram illustrating a relationship between a viewer terminal and servers.

The information acquisition process is described. FIG. 19 is a diagram illustrating a relationship between a viewer terminal and servers.

Where the distribution user permits participation in the game "SAMURAI," the information processing apparatus 10 notifies the game server 12 of permission of participation. The game server generates and transmits a session ID to the information processing apparatus 10 and transmits also to the session server 11 which manages session information in the information processing system 1 in a concentrated manner (S10). Consequently, the distribution user can accept a participation request from other information processing apparatus 10 and can play the game with a different user. It is to be noted that the information processing apparatus 10 of the distribution user distributes encoded streaming data to the sharing server 9.

The viewing user starts up a viewing application in the information processing apparatus 10 (S12). The information processing apparatus 10 establishes connection to the sharing server 9 (S14), and the sharing server 9 transmits the distributor specification information and the game specification information to the information processing apparatus 10 (S16). It is to be noted that the distributor specification information and the game specification information may be transmitted when a content list screen image is generated in the information processing apparatus 10 or may be transmitted when a content is selected from within a list screen image by a viewing user.

The command information acquisition section 306 issues a request for command information to the game server 12 specified by the game specification information (S18). As described hereinabove, the game server 12 is a server which processes a session of a game and is provided for each game in the information processing system 1. Accordingly, the command information acquisition section 306 specifies the game server 12 which processes a session of the game "SAMURAI" from the game specification information and issues a request for command information to the specified game server 12. Here, if "SAMURAI" is a game of the type which does not accept a command from an external user, the game server 12 notifies the information processing apparatus 10 that no command information exists. On the other hand, if "SAMURAI" is a game of the type which accepts a command from an external user, then the game server 12 transmits command information to the information processing apparatus 10. The command information acquisition section 306 acquires the command information and passes the command information to the command image generation section 324.

The session information acquisition section 310 confirms presence or absence of session information to the session server 11 based on the game specification information (S22). If the distribution user does not permit participation in the game, then no session information exists. On the other hand, if the distribution user permits participation in the game, then the session server 11 transmits the session information to the information processing apparatus 10 (S24). The session information acquisition section 310 acquires the session information and passes the session information to the participation mark generation section 328.

The store information acquisition section 308 issues a request for an address which provides a sale screen image of the game to the store server 16 based on the game specification information (S26). The store server 16 transmits the address of the sale page of the game "SAMURAI," and the store information acquisition section 308 acquires the address and passes the address to the purchase mark generation section 326.

It is to be noted that, after the establishment of connection at S14, though not depicted, live distribution of streaming data and transmission of comment data are carried out from the sharing server 9 to the information processing apparatus 10 and are acquired by the streaming data acquisition section 302 and the comment data acquisition section 312, respectively.

It is to be noted that the session server 11 may manage user information and address information of the information processing apparatus 10 connected to the network 3 and information for specifying a game being executed in the information processing apparatus 10 irrespective of whether or not a session exists. In this case, if the acquisition unit 300 of the information processing apparatus 14 transmits distributor specification information and game specification information of a content to the session server 11, then the session server 11 confirms the user and the user specification information of the information processing apparatus 10. If the session server 11 has command information to the game retained therein in advance, then the session server 11 transmits the command information to the information processing apparatus 14, but if the session server 11 has the address of the sale page of the game retained therein in advance, then the session server 11 transmits the address to the information processing apparatus 14. It is to be noted that, if the session server 11 does not have the command information retained therein, then it acquires the command information from the corresponding game server 12. Further, if the session server 11 does not have the address of the sale page retained therein, then it acquires the address from the store server 16. Then, the session server 11 transmits the acquired information and address to the information processing apparatus 14. By doing in this way, the information processing apparatus 14 of the viewer can acquire information necessary to configure a viewing screen image only by accessing the session server 11.

Although the example in which command information is provided from the game server 12 or the session server 11 is described above, command information may otherwise be provided from the information processing apparatus 10. Especially in such a case that command information changes in response to a game scene, if the information processing apparatus 10 transmits command information directly to the information processing apparatus 14, then the viewing user can input an appropriate command for the game scene. It is to be noted that, where the situation of the game play is conveyed on the real time basis to the session server 11, every time command information is updated, the session server 11 may transmit command information to the information processing apparatus 14.

Referring back to FIG. 18, the streaming data reproduction section 322 decodes and reproduces streaming data acquired by the streaming data acquisition section 302, and a live distribution image is displayed in the live video display region 274. The command image generation section 324 generates command images 380a, 380b and 380c based on command information acquired by the command information acquisition section 306, and the command images 380a, 380b and 380c are displayed in the command image display region 276. The command information includes information for representing command types of the command images 380a, 380b and 380c displayed as GUI buttons, and characters "Arrow" are displayed on the command image 380a; "Fire" on the command image 380b; and "Bomb" on the command image 380c.

Here, the command image 380a is a GUI which designates a command for causing an arrow to fall in the game screen image being live relayed; the command image 380b is a GUI which designates a command for injecting fire in the game screen image; and the command image 380c is a GUI which designates a command for dropping a bomb in the game screen image. If the viewing user operates the inputting apparatus 6 to select one of the command images, then the command corresponding to the command image is transmitted to the information processing apparatus 10 of the distribution user through the game server 12. Thus, the game "SAMURAI" in the information processing apparatus 10 executes a process of reflecting the command on the progress of the game. Consequently, an interactive game environment is implemented. It is to be noted that a widget for sharing impressions or evaluation of users such as a "like!" button may be prepared.

The purchase mark generation section 326 generates a purchase image based on the address of the sale site acquired by the store information acquisition section 308, and the purchase image is displayed in the purchase mark display region 280. Here, the purchase image is a Buy mark 384, and the address of the sale site is linked to the purchase mark display region 280. If the viewing user operates the inputting apparatus 6 to select the Buy mark 384, then the information processing apparatus 10 connects to the address of the sale site, and a purchase screen image is displayed on the outputting apparatus 15. It is to be noted that, if the store information acquisition section 308 fails to acquire the address of the sale site, then the Buy mark 384 is not displayed in the purchase mark display region 280. Further, where the game is installed already in the information processing apparatus 14, the Buy mark 384 is not displayed. The purchase mark generation section 326 confirms the installation situation of the game and, when the game is installed already, the purchase mark generation section 326 does not display the Buy mark 384 in the purchase mark display region 280. It is to be noted that, in this case, for example, a "Play" button for starting up the game may be displayed such that, if the "Play" button is selected, then the application execution unit 106 starts up the game so that that the viewing user can play the game.

The participation mark generation section 328 generates a participation image based on session information acquired by the session information acquisition section 310, and the participation image is displayed in the participation mark display region 278. Here, the participation image is a Join mark 382, and the address (URI) of the session is linked to the participation mark display region 278. If the viewing user operates the inputting apparatus 6 to select the Join mark 382, then the application execution unit 106 starts up the "SAMURAI" game in a state in which it participates in the session. Consequently, the viewing user can participate in the game of the distribution user from the viewing screen image depicted in FIG. 18. It is to be noted that, if the session information acquisition section 310 fails to acquire the session information, then the Join mark 382 is not displayed in the participation mark display region 278.

The comment image generation section 330 generates a comment image based on comment data acquired by the comment data acquisition section 312, and the comment image is displayed in the comment display region 286. Preferably, comment data from a plurality of users who access the sharing server 9 are successively displayed in the comment display region 286. This makes it possible for the viewing user to browse comments synchronized with a live video displayed in the live video display region 274, and a game video distribution environment which provides a realistic sensation is implemented.

A selection process of a command image 380 is described. In the command processing unit 340, the command input acceptance section 342 accepts a selection input of the command image 380 by the user. The user would place a focus frame at a desired command image 380 in the command image display region 276 and depress the determination key of the inputting apparatus 6 to select the command image 380. It is to be noted that the user may otherwise move the cursor to the command image 380 and depress the determination key of the inputting apparatus 6 to select the command image 380. The command transmission section 344 transmits the command accepted by the command input acceptance section 342 to the game server 12 together with the distributor specification information. The game server 12 recognizes that the transfer destination is the user A from the distributor specification information and transmits a command to the information processing apparatus 10 of the user A.

It is to be noted that, if the session server 11 manages the address information of the information processing apparatus as described above and the information processing apparatus has acquired the address information, then also it is possible for the command transmission section 344 to transmit the command to the information processing apparatus 10. It is to be noted that the command transmission section 344 may transmit the command not to the game server 12 but to the session server 11 such that the session server 11 transmits the command to the information processing apparatus 10. Although, in the information processing system 1, various transmission routes of a command are available in this manner, any route may be adopted if a command reaches the information processing apparatus 10 therealong.

Figure 20:
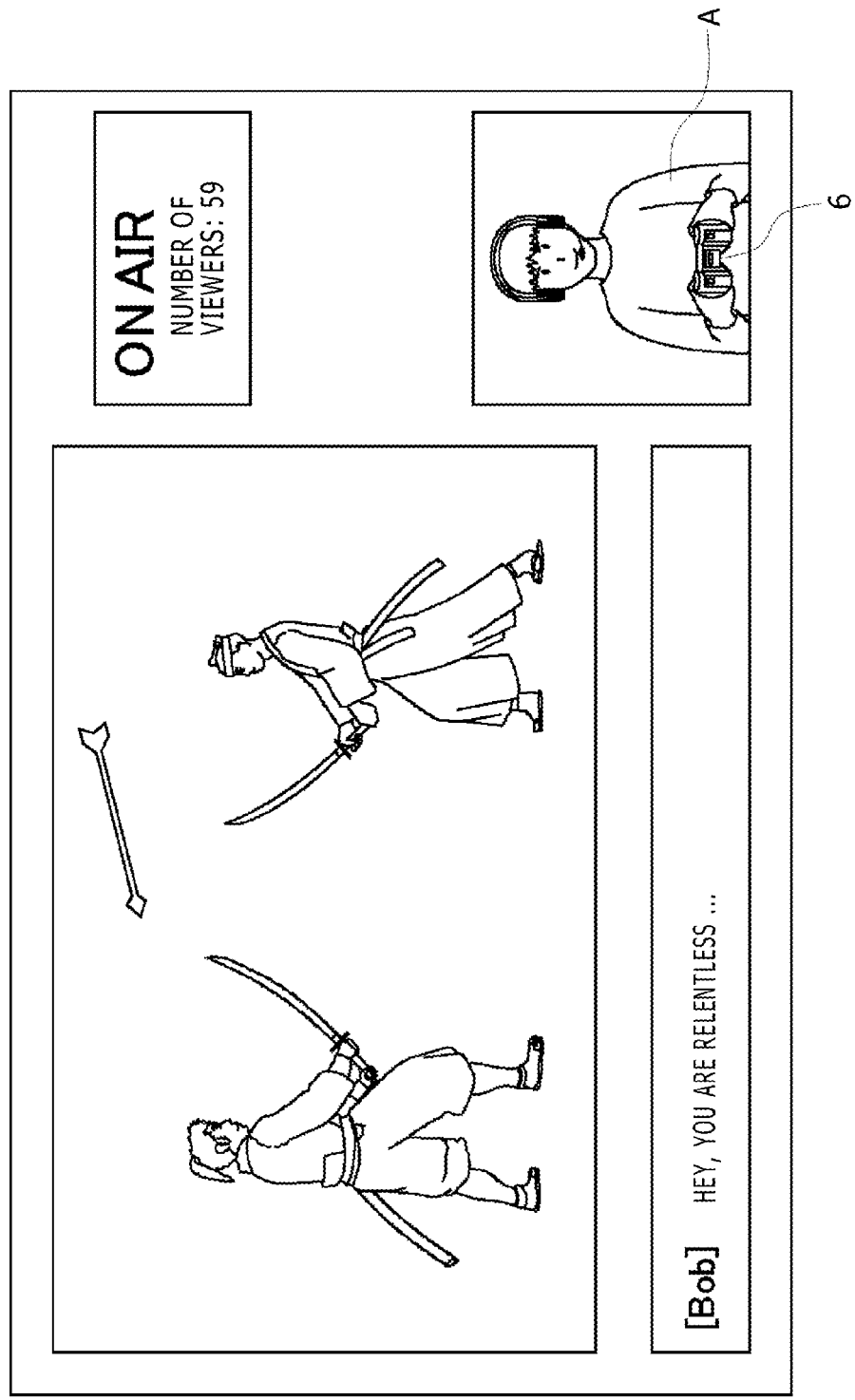
FIG. 20 is a diagram depicting an example of a game screen image displayed on the outputting apparatus.

In the information processing apparatus 10, the game accepts a command and reflects the command on game processing. For example, if the command image 380a is selected on the viewing screen image depicted in FIG. 18, then the "Arrow" command is transmitted to the information processing apparatus 10, and the game reflects the command on game processing. FIG. 20 depicts an example of a game screen image in which an arrow comes flying. In this manner, in the information processing system 1, the user not only can view a live video but also can participate in a game from a viewing screen image. Thus, an interactive game execution environment is generated.

A command inputted from a live video viewing screen image in the present embodiment may be any command which is reflected on game processing, and the type of the command is not fixed. For example, where choices A to D to an answer are available in a quiz game, viewers may select those choices which are individually believed correct and transmit the choices to the information processing apparatus 10. At this time, such production that rates of the choices A to D are displayed on the game screen image is carried out. Alternatively, the command may be such that the game causes the game screen image to display supporting messages from viewers.

A comment inputting process is described. In the comment processing unit 360, the comment input acceptance section 362 accepts an input of a comment by the viewing user. Characters accepted by the comment input acceptance section 362 are suitably displayed in the comment input field 284 so that the viewing user can confirm them. If the viewing user completes the comment input and then selects the comment mark display region 282, then the comment transmission section 364 transmits the comment data to the sharing server 9. The sharing server 9 accepts the comment data from the viewing user and distributes the comment data to the viewing user. It is to be noted that the distributed comment data is acquired by the comment data acquisition section 312 in the information processing apparatus 10 and displayed in the comment display region 286 as described hereinabove.

In the present embodiment, the information processing apparatus 14 of the viewing user may not have the function of the information processing apparatus 10 but may be a terminal apparatus having the Web browser function as described hereinabove. In the case where the information processing apparatus 14 does not have a viewing application, although the information processing apparatus 14 can display a live video, a comment and so forth on the viewing screen image, it cannot communicate with the game server 12. Therefore, the information processing apparatus 14 cannot display the command image 380 and cannot directly transmit a command to the game server 12.

However, comment data inputted to the comment input field 284 is transmitted to the sharing server 9 by the comment transmission section 364 and then transferred from the sharing server 9 to the information processing apparatus 10 of the distribution user. Therefore, in the information processing system 1, when the viewing user inputs a command to the comment input field 284, the comment transmission section 364 transmits the inputted command as comment data to the distributor to the information processing apparatus 10 through the sharing server 9 such that, in the information processing apparatus 10, the game extracts the command from the comment data and reflects the command on processing of the game. In particular, in the information processing apparatus 10 depicted in FIG. 6, the comment image generation section 116 extracts a predetermined character string associated with the command and passes the predetermined character string to the game so that the game can generate a game screen image on which the command is reflected. The predetermined character string preferably is a character string which is not used in an ordinary comment and may be, for example, a command delimited by three double quotations (""") on the front side and two double quotations ("") on the rear side. For example, if the comment image generation section 116 detects """Arrow"" in comment data, then it may pass a character string between the three double quotations and the two double quotations to the game so that the game can interpret the character string as a command.

The present invention has been described based on the embodiment thereof. This embodiment is illustrative, and it can be recognized by those skilled in the art that various modifications are possible in combination of the constituent elements and the processes of the embodiment and that also such modifications are included in the scope of the present invention.

Figure 21:
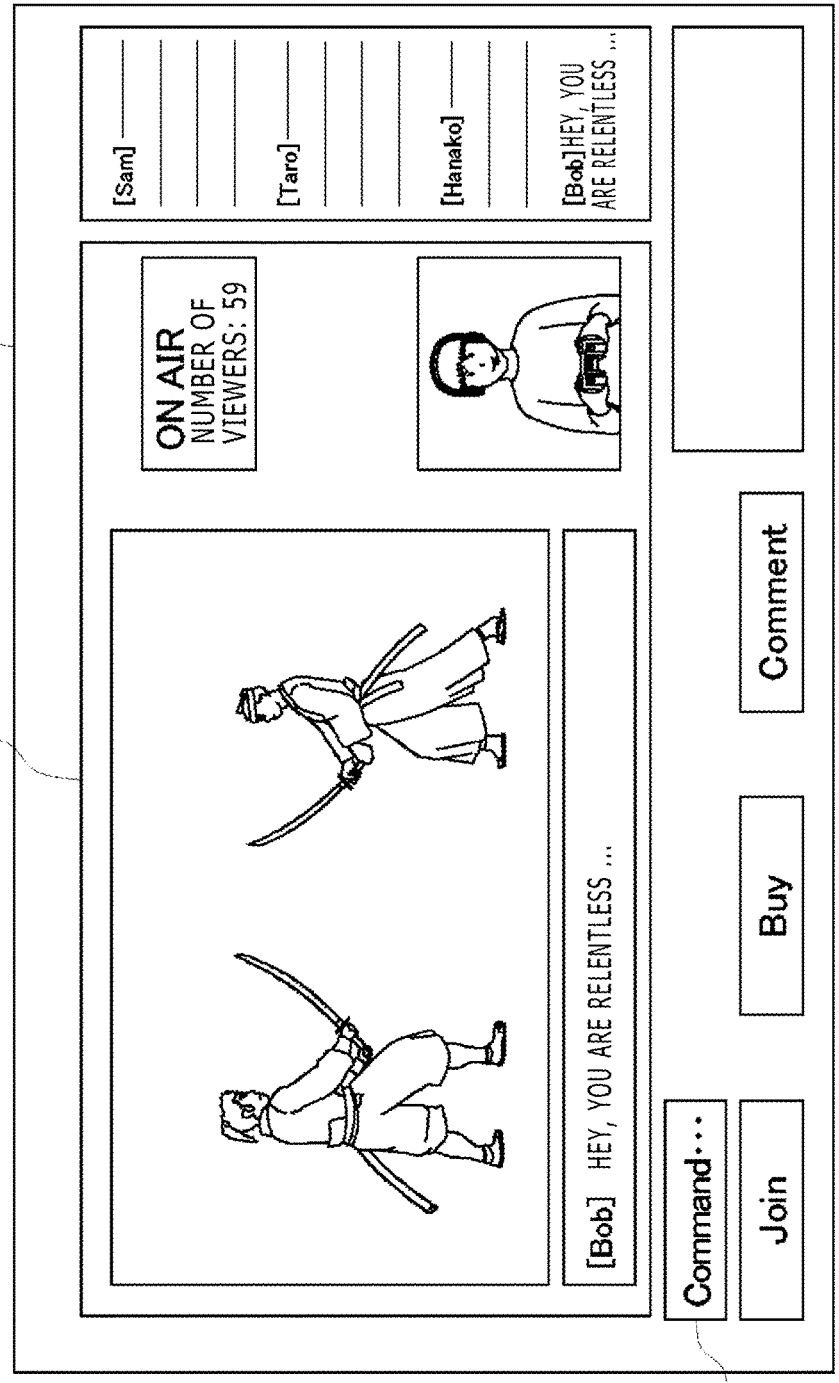
FIG. 21 is a diagram depicting another example of a viewing screen image displayed on the outputting apparatus.

FIG. 21 depicts another example of a viewing screen image displayed on the outputting apparatus 15. The image generation unit 320 generates viewing image data including a live video in accordance with a template 288 and outputs the viewing image data to the outputting apparatus 15. Compared with the viewing screen image depicted in FIG. 18, in the viewing screen image depicted in FIG. 21, the command image display region 276 for displaying the command image 380 is not provided, but a command mark display region 292 is provided instead. In the viewing screen image depicted in FIG. 21, since the command image display region 276 is eliminated from the display region of the outputting apparatus 15, the live video display region 274 can have a greater area than in the case of the viewing screen image depicted in FIG. 18.

As described hereinabove, the command information acquisition section 306 acquires command information to an application based on application specification information. Here, the command information is data necessary to display information (image) for specifying the command when the focus frame is placed on the command mark display region 292.

FIG. 22 depicts an example of a command image to be displayed. If the focus frame is placed on the command mark display region 292, then the command image generation section 324 generates command images 380a, 380b and 380c based on the command information acquired by the command information acquisition section 306, and the command images 380a, 380b and 380c are displayed in the proximity of the command mark display region 292. It is to be noted that, although, in the present example, the command images 380a, 380b and 380c are displayed above the command mark display region 292, the command images 380a, 380b and 380c may otherwise be displayed at a position at which they do not overlap with the live video display region 274 (for example, on the right side of the command mark display region 292).

It is to be noted that, although it is described that, in the present modification, command information acquired by the command information acquisition section 306 is used to display a command image when the focus frame is placed on the command mark display region 292, the command image 380 may otherwise be displayed without using it as a condition that the focus frame is placed on the command mark display region 292. In this case, the command image 380 is displayed independently of the placement of the focus frame, and accordingly, the command image 380 is displayed preferably at a position at which it does not overlap with the live video display region 274. If the user places the focus frame on one of the command images 380 and presses the determination key of the inputting apparatus 6 to select the command image 380, then the command input acceptance section 342 accepts the selection input of the command image 380 and the command transmission section 344 transmits the command to the game server 12 together with distributor specification information.

It is to be noted that, even if the user watches the command image 380, the user may not possibly be able to recognize a method of use of the command image 380 immediately. Therefore, if the focus frame is placed on a command image 380, then the command image generation section 324 may display explanation information of the command. This explanation information may be acquired by the command information acquisition section 306 together with the command information. For example, the explanation information of "Arrow" is an explanatory text "This Arrow command can be used to shoot an arrow from above," and the explanation information of "Bomb" is an explanatory text "This Bomb command can be used to drop a bomb from above." Where such an explanatory text is displayed when the focus frame is placed on a command image 380, the user can know the substance of the command. Such an explanatory text can be displayed similarly also when the focus frame is placed on a command image 380 in the command image display region 276 depicted in FIG. 18.

It is to be noted that not only an explanatory text of each command but also an explanatory text of a button itself may be displayed. It has been described that, in FIG. 22, when the focus frame is placed on a command button in the command mark display region 292, three kinds of command images 380 are displayed. However, together with the command images 380, an explanatory text of a command button itself, for example, an explanatory text "It is possible to attack the enemy character with various weapons" may be displayed. This explanatory text is placed above the command image 380a. Consequently, the user can know the significance of the command group and can know the significance of each command by applying the focus frame to the command.

It is to be noted that, in the description of the embodiment, it is described that, if a viewing user inputs a command to the comment input field 284, then the comment transmission section 364 can transmit the inputted command as comment data to a distributor to the information processing apparatus 10 through the sharing server 9. If the user selects a command image 380 in the viewing screen image depicted in FIG. 22 or 18, then the comment transmission section 364 may transmit comment data associated with the command image 380 to the information processing apparatus 10. If a command image 380 is selected in this manner, then a predetermined character string corresponding to the command may be transmitted as comment data to the information processing apparatus 10, and the information processing apparatus 10 may extract the character string so that the game can interpret the character string as a command.

It is to be noted that, as described in the embodiment, the information processing apparatus 14 may be a terminal apparatus which does not have the function of the information processing apparatus 10 but has the Web browser function. In this case, if the viewing user inputs a command to the comment input field 284, then the comment transmission section 364 transmits the inputted command as comment data to the distributor to the information processing apparatus 10 through the sharing server 9. In order to let the viewing user know which command can be inputted, for example, the information processing apparatus 10 may notify the information processing apparatus 14 of a command group which can be inputted so that the Web browser of the information processing apparatus 14 can display the command group. In this example, the command group includes "Arrow," "Fire" and "Bomb," and the information processing apparatus 10 issues a notification of the command group. Thus, the viewing user can grasp which one of the commands should be inputted to the comment input field 284. It is to be noted that, as described above, the information processing apparatus 10 may issue a notification also of explanation information of each command similarly so that the information processing apparatus 14 can display the substance of the commands by explanation texts.

REFERENCE SIGNS LIST

1 . . . Information processing system, 4 . . . Outputting apparatus, 5 . . . Network server, 6 . . . Inputting apparatus, 9 . . . Sharing server, 10 . . . Information processing apparatus, 11 . . . Session server, 12 . . . Game server, 13 . . . Management server, 14 . . . Information processing apparatus, 15 . . . Outputting apparatus, 16 . . . Store server, 100 . . . Processing part, 102 . . . Communication unit, 104 . . . Acceptance unit, 106 . . . Application execution unit, 110 . . . Image generation unit, 112 . . . Game image generation section, 114 . . . Picked up image generation section, 116 . . . Comment image generation section, 118 . . . Status image generation section, 120 . . . Menu image generation section, 130 . . . Image changeover unit, 150 . . . Sharing processing unit, 152 . . . Input image generation section, 154 . . . Confirmation processing section, 156 . . . Encoding section, 158 . . . Distribution processing section, 160 . . . Template retaining section, 162 . . . Information acquisition section, 300 . . . Acquisition unit, 302 . . . Streaming data acquisition section, 304 . . . Specification information acquisition section, 306 . . . Command information acquisition section, 308 . . . Store information acquisition section, 310 . . . Session information acquisition section, 312 . . . Comment data acquisition section, 314 . . . Content information acquisition section, 320 . . . Image generation unit, 322 . . . Streaming data reproduction section, 324 . . . Command image generation section, 326 . . . Purchase mark generation section, 328 . . . Participation mark generation section, 330 . . . Comment image generation section, 332 . . . List image generation section, 340 . . . Command processing unit, 342 . . . Command input acceptance section, 344 . . . Command transmission section, 360 . . . Comment processing unit, 362 . . . Comment input acceptance section, 364 . . . Comment transmission section, 370 . . . Template retaining unit

INDUSTRIAL APPLICABILITY

The present invention can be utilized in a technical field in which streaming data is distributed or viewed.

The invention claimed is:

1. An information processing apparatus comprising:
   a first acquisition unit configured to acquire streaming data including an application image;
   a second acquisition unit configured to acquire command information to an application based on specification information of the application;
   an image generation unit configured to reproduce the streaming data to generate an application image and generate a command image based on the command information;
   an acceptance unit configured to accept a command input to the application in response to selection of the command image; and
   a transmission unit configured to transmit the inputted command;
   wherein the application is a game being played by a player user and being viewed by a spectator user, and the inputted command is a command inputted by the spectator user that is reflected on processing of the game, such that an interactive game execution environment is implemented;
   wherein at least one image, of the player user while the player user plays the game being viewed by the spectator user, is viewable by the spectator user while the spectator user views the game as the game is played;
   wherein the at least one image includes a face, and a face of the player user is authenticated as being the face in the at least one image; and
   wherein while the player user plays the game, a voice of the player user is conveyed to the spectator user when the player user mentions content of the streaming data viewable by the player user and the spectator user, the content being other than the game being viewed by the spectator, such that an environment is established in which the player user and the spectator user seem to exist in a same space.

2. The information processing apparatus according to claim 1, further comprising
   a third acquisition unit configured to acquire specification information of a distributor who provides the streaming data and specification information of the application,
   wherein the transmission unit transmits the inputted command based on the specification information of the distributor.

3. The information processing apparatus according to claim 1, wherein the second acquisition unit acquires the command information from a server.

4. The information processing apparatus according to claim 1, further comprising
   a fourth acquisition unit configured to acquire information relating to purchase of the application based on the specification information of the application,
   wherein the image generation unit generates a purchase image based on the purchase information to generate image data including the purchase image and the application image.

5. The information processing apparatus according to claim 1, wherein the transmission unit transmits the inputted command as comment data to a distributor to a server.

6. An information processing apparatus comprising:
   an execution unit configured to execute an application;
   an image generation unit configured to generate image data to be displayed on an outputting apparatus;
   a sharing processing unit configured to transmit the image data generated by the image generation unit; and
   an acquisition unit configured to acquire information relating to the image data,
   wherein the image generation unit generates image data including an application image and an image of the information acquired by the acquisition unit, and
   the sharing processing unit encodes and transmits the image data to be displayed on the outputting apparatus;
   wherein the application is a game being played by a player user and being viewed by a spectator user, and the acquired information relates to a command of the spectator user that is reflected on processing of the game, such that an interactive game execution environment is implemented;
   wherein at least one image, of the player user while the player user plays the game being viewed by the spectator user, is viewable by the spectator user while the spectator user views the game as the game is played;
   wherein the at least one image includes a face, and a face of the player user is authenticated as being the face in the at least one image; and
   wherein while the player user plays the game, a voice of the player user is conveyed to the spectator user when the player user mentions content of the streaming data viewable by the player user and the spectator user, the content being other than the game being viewed by the spectator, such that an environment is established in which the player user and the spectator user seem to exist in a same space.

7. The information processing apparatus according to claim 6, wherein
   the acquisition unit acquires comment data as the information relating to the image data,
   the image generation unit generates image data including the application image and a comment image, and
   the sharing processing unit encodes and transmits the image data including the application image and the comment image.

8. The information processing apparatus according to claim 6, wherein
   the image generation unit generates image data including a picked up image supplied from an image pickup apparatus, and the sharing processing unit encodes and transmits the image data including the application image and the picked up image.

9. The information processing apparatus according to claim 6, further comprising an image changeover unit configured to change over an image to be displayed on the outputting apparatus between a menu image and the application image, wherein the sharing processing unit transmits, when the menu image is displayed on the outputting apparatus, image data which does not include the menu image.

10. A non-transitory, computer readable recording medium containing a computer program for causing a computer to carry out actions, comprising:

acquiring streaming data including an application image;
acquiring command information to an application based on specification information of the application;
reproducing the streaming data;
generating a command image based on the command information;
accepting a command input to the application by selection of the command image; and
transmitting the inputted command;
wherein the application is a game being played by a player user and being viewed by a spectator user, and the transmitted command is a command of the spectator user that is reflected on processing of the game, such that an interactive game execution environment is implemented;
wherein at least one image, of the player user while the player user plays the game being viewed by the spectator user, is viewable by the spectator user while the spectator user views the game as the game is played;
wherein the at least one image includes a face, and a face of the player user is authenticated as being the face in the at least one image; and
wherein while the player user plays the game, a voice of the player user is conveyed to the spectator user when the player user mentions content of the streaming data viewable by the player user and the spectator user, the content being other than the game being viewed by the spectator, such that an environment is established in which the player user and the spectator user seem to exist in a same space.

11. A non-transitory, computer readable recording medium containing a computer program for causing a computer to carry out actions, comprising:

executing an application;
generating image data to be displayed on an outputting apparatus;
transmitting the generated image data; and
acquiring information relating to the image data;
the image data including an application image and an image of the acquired information;
the image data to be displayed on the outputting apparatus being encoded and transmitted;
wherein the application is a game being played by a player user and being viewed by a spectator user, and the transmitted data is data of the spectator user that is reflected on processing of the game, such that an interactive game execution environment is implemented;
wherein at least one image, of the player user while the player user plays the game being viewed by the spectator user, is viewable by the spectator user while the spectator user views the game as the game is played;
wherein the at least one image includes a face, and a face of the player user is authenticated as being the face in the at least one image; and
wherein while the player user plays the game, a voice of the player user is conveyed to the spectator user when the player user mentions content of the streaming data viewable by the player user and the spectator user, the content being other than the game being viewed by the spectator, such that an environment is established in which the player user and the spectator user seem to exist in a same space.

12. The information processing apparatus according to claim 6, wherein the sharing processing unit generates an input image which indicates choices regarding whether or not microphone sound is to be included in distribution of the image data or choices regarding whether or not a picked up image of a camera is to be included in distribution of the image data.

13. The information processing apparatus according to claim 6, wherein the sharing processing unit generates an input image which indicates choices of a distribution service of the image data.

14. An information processing system comprising:

a sharing server configured to provide a sharing service;
a first information processing apparatus configured to transmit an application image to the sharing server;
a second information processing apparatus configured to acquire and reproduce streaming data including the application image from the sharing server; and
a management server configured to process an application session,
wherein the second information processing apparatus acquires command information to an application from the management server to display a command image and transmits a command to the management server in response to selection of the command image, and
the management server transmits the command to the first information processing apparatus;
wherein the application is a game being played by a player user and being viewed by a spectator user, and the transmitted command is a command of the spectator user that is reflected on processing of the game, such that an interactive game execution environment is implemented;
wherein at least one image, of the player user while the player user plays the game being viewed by the spectator user, is viewable by the spectator user while the spectator user views the game as the game is played;
wherein the at least one image includes a face, and a face of the player user is authenticated as being the face in the at least one image; and
wherein while the player user plays the game, a voice of the player user is conveyed to the spectator user when the player user mentions content of the streaming data viewable by the player user and the spectator user, the content being other than the game being viewed by the spectator, such that an environment is established in which the player user and the spectator user seem to exist in a same space.

* * * * *